United States Patent
Hilligoss et al.

(10) Patent No.: US 12,080,898 B2
(45) Date of Patent: Sep. 3, 2024

(54) THERMAL RUNAWAY MITIGATION SYSTEM FOR HIGH CAPACITY ENERGY CELL

(71) Applicant: Cummins Inc., Columbus, IN (US)

(72) Inventors: Lawrence Hilligoss, Ashland, OR (US); Daniel Riegels, Ashland, OR (US); Paul A. Daniel, Ashland, OR (US); Adrian G. Lamy, Hillsborough, CA (US)

(73) Assignee: CUMMINS INC., Columbus, IN (US)

(*) Notice: Subject to any disclaimer, the term of this patent is extended or adjusted under 35 U.S.C. 154(b) by 384 days.

(21) Appl. No.: 16/956,717

(22) PCT Filed: Dec. 21, 2018

(86) PCT No.: PCT/US2018/067157
§ 371 (c)(1),
(2) Date: Jun. 22, 2020

(87) PCT Pub. No.: WO2019/126681
PCT Pub. Date: Jun. 27, 2019

(65) Prior Publication Data
US 2020/0335737 A1    Oct. 22, 2020

Related U.S. Application Data

(60) Provisional application No. 62/667,146, filed on May 4, 2018, provisional application No. 62/609,466, filed on Dec. 22, 2017.

(51) Int. Cl.
*H01M 50/124* (2021.01)
*H01M 10/6555* (2014.01)

(52) U.S. Cl.
CPC ..... *H01M 50/124* (2021.01); *H01M 10/6555* (2015.04); *H01M 50/1245* (2021.01)

(58) Field of Classification Search
None
See application file for complete search history.

(56) References Cited

U.S. PATENT DOCUMENTS 7,285,334 B1    10/2007   Yamashita et al.
2009/0098417 A1*   4/2009   Yamada .............. H01M 50/557
                                                29/623.2

(Continued)

FOREIGN PATENT DOCUMENTS

CN    104218194 A    12/2014
CN    206585035 U    10/2017

(Continued)

OTHER PUBLICATIONS

JP2014049427A—Machine Translation (Year: 2014).*

(Continued)

*Primary Examiner* — Brian R Ohara
*Assistant Examiner* — Patrick Marshall Greene
(74) *Attorney, Agent, or Firm* — Faegre Drinker Biddle & Reath LLP

(57) ABSTRACT

A cell assembly group is provided, comprising: a plurality of cell assemblies, each cell assembly including an electrochemical cell and an outer wrap surrounding the cell; a foam sheet positioned adjacent one side of one cell assembly; a plurality of heat plates, each heat plate being positioned between two cell assemblies; and at least one spacer positioned between one heat plate and one cell assembly. Each outer wrap of each cell assembly of the plurality of cell assemblies includes a body having an inner surface that engages a rearward wall of the electrochemical cell of the cell assembly, a first portion having a flame barrier that engages a forward wall of the electrochemical cell of the cell assembly, and a second portion that engages an outer surface of the first portion.

20 Claims, 17 Drawing Sheets

(56) References Cited

U.S. PATENT DOCUMENTS

| | | | | |
|---|---|---|---|---|
| 2009/0142628 A1* | 6/2009 | Okada | ................... | H01M 50/20 |
| | | | | 429/8 |
| 2010/0216016 A1* | 8/2010 | Seino | ................. | H01M 50/593 |
| | | | | 429/185 |
| 2014/0335398 A1 | 11/2014 | Partin et al. | | |
| 2015/0171383 A1* | 6/2015 | Ahn | ..................... | H01M 50/411 |
| | | | | 428/354 |
| 2016/0359206 A1* | 12/2016 | Eberleh | ............... | H01M 10/653 |
| 2017/0263983 A1* | 9/2017 | Bao | ................... | H01M 10/0431 |
| 2020/0020898 A1* | 1/2020 | Yi | ....................... | H01M 50/183 |

FOREIGN PATENT DOCUMENTS

| | | | | |
|---|---|---|---|---|
| CN | 206711927 U | 12/2017 | | |
| EP | 1102336 B1 * | 9/2007 | .......... | H01M 2/0267 |
| EP | 2615659 A1 | 7/2013 | | |
| JP | 2014049427 A * | 3/2014 | | |
| KR | 10-2017-0014309 A | 2/2017 | | |

OTHER PUBLICATIONS

Lopez, Carlos F., et al., "Experimental Analysis of Thermal Runaway and Propagation in Lithium-Ion Battery Modules," Journal of The Electrochemical Society, 162 (9), Jul. 9, 2015; 11 pages.
International Search Report and Written Opinion issued by the ISA/US, Commissioner for Patents, dated May 1, 2019, for International Application No. PCT/US2018/067157; 11 pages.

\* cited by examiner

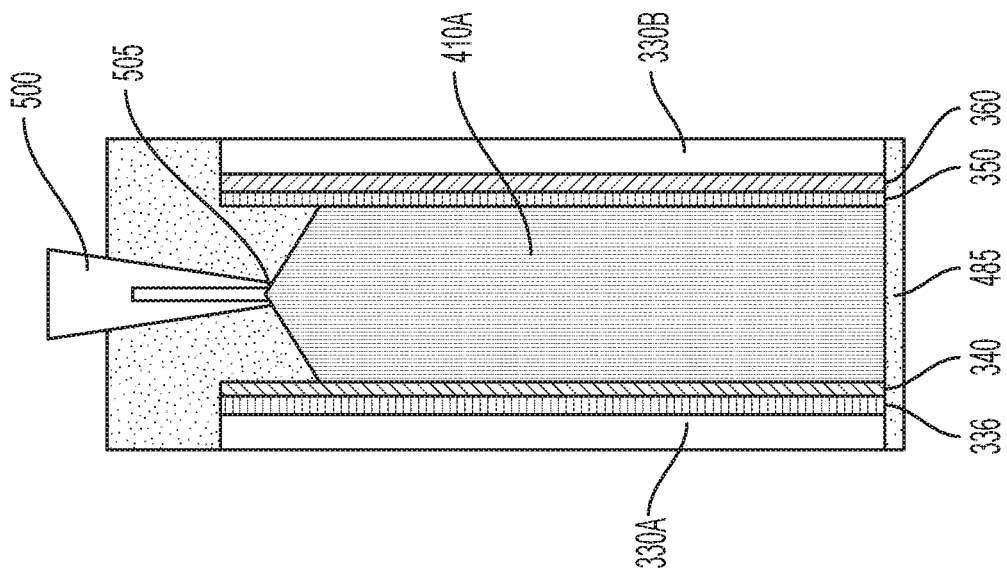
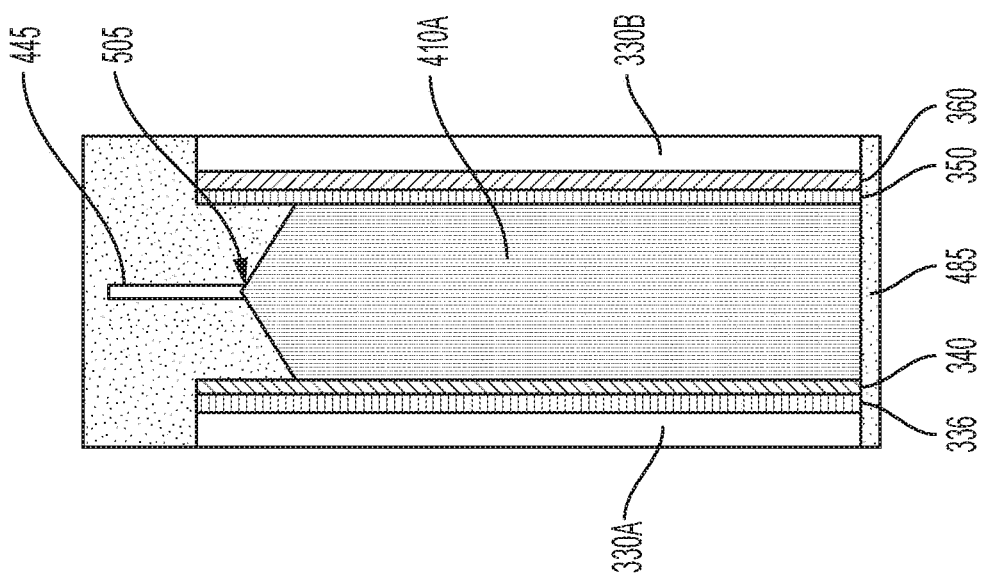

THERMAL RUNAWAY MITIGATION SYSTEM FOR HIGH CAPACITY ENERGY CELL

CROSS-REFERENCE TO RELATED APPLICATIONS

The present application is a national phase filing under 35 U.S.C. § 371 of International Application No. PCT/US2018/067157, filed on Dec. 21, 2018, which claims priority to U.S. Provisional Ser. No. 62/609,466, entitled "THERMAL RUNAWAY MITIGATION SYSTEM AND METHODS," filed on Dec. 22, 2017, and U.S. Provisional Ser. No. 62/667,146, entitled "THERMAL RUNAWAY MITIGATION SYSTEM FOR HIGH CAPACITY ENERGY CELL," filed on May 4, 2018, the entire disclosures of which being hereby expressly incorporated herein by reference.

FIELD OF THE DISCLOSURE

The present disclosure relates generally to devices, methods and systems for thermal runaway mitigation and more specifically to systems for protection against propagation of thermal runaway between adjacent electrochemical cells.

BACKGROUND OF THE DISCLOSURE

Battery packs containing one or more rechargeable electrochemical cells, such as lithium-ion cells, are suitable for a variety of applications including utility vehicles that require compact, mission critical power for industry. However, these battery packs may be prone to thermal runaway, which is when the rate of internal heat generation exceeds the rate at which the heat can be expelled. This results in increased reaction rate and heat generation, which may in turn eventually lead to the generation of sufficient heat to cause combustion of the battery as well as materials in proximity to the battery. Thermal runaway may be initiated by a short circuit within the cell, improper cell use, physical abuse, manufacturing defects, or exposure of the cell to extreme external temperatures.

A thermal runaway event can cause heating of the entire cell up to a temperature of 900° C. or more. Due to the increased temperature of the cell undergoing thermal runaway, the temperature of adjacent cells within the battery pack will also increase. If the temperature of these adjacent cells is allowed to increase unimpeded, the adjacent cells may also enter into a state of thermal runaway, leading to a cascading effect where the initiation of thermal runaway within a single cell propagates throughout the entire battery pack. As a result, power from the battery pack is interrupted and the system employing the battery pack is more likely to incur collateral damage from the associated release of thermal energy.

Various approaches have been employed to either reduce the risk of thermal runaway or reduce the risk of thermal runaway propagation. For example, approaches have included insulating the battery terminals and using specifically designed battery storage containers to reduce the risk of shorting during storage and/or handling; developing new cell chemistries and/or modifying existing cell chemistries; providing additional shielding at the cell level, thus inhibiting the flow of thermal energy from the cell undergoing thermal runaway to adjacent cells; using a spacer assembly to maintain the position of the battery undergoing thermal runaway in its predetermined location within the battery pack, thereby helping to minimize the thermal effects on adjacent cells; and using one or more thermal barrier elements to prevent a thermal runaway event initiated in one group of cells from propagating to cells of neighboring groups.

SUMMARY

In one embodiment, the present disclosure provides a cell assembly, comprising: an electrochemical cell including a positive electrode and a negative electrode, each extending from an enclosure, the enclosure including a forward wall and a rearward wall; and an outer wrap including a body having an inner surface that engages the rearward wall of the electrochemical cell, a first portion having a flame barrier that engages the forward wall of the electrochemical cell, and a second portion that engages an outer surface of the first portion; wherein one of the positive electrode or the negative electrode extends through an upper opening formed by the outer wrap and another of the positive electrode or the negative electrode extends through a lower opening formed by the outer wrap. In one aspect of this embodiment, the second portion of the body includes a tape strip that engages the outer surface of the first portion to secure the second portion to the first portion. In a variant of this aspect, the tape strip is formed from an acrylic based material. In another variant, the tape strip is positioned adjacent a first side edge of the outer wrap body and the flame barrier is positioned adjacent a second, opposite side edge of the outer wrap body. In another aspect of this embodiment, the enclosure includes a first side wall that is positioned adjacent a first fold edge of the outer wrap and a second side wall that is positioned adjacent a second fold edge of the outer wrap. In another aspect, the enclosure includes an upper wall that is positioned adjacent an upper edge of the outer wrap and a lower wall that is positioned adjacent a lower edge of the outer wrap. In still another aspect, the electrochemical cell is a lithium ion cell having at least a 45 amp/hour rating. In yet another aspect of this embodiment, the outer wrap body is formed from aramid fiber material having a thickness of at least 0.007 inches. In a further aspect, the flame barrier is formed from a ceramic coated polyethylene terephthalate sheet having a thickness of at least 0.006 inches.

In another embodiment of the present disclosure, a method for assembling a cell assembly is provided, comprising: positioning an electrochemical cell onto an inner surface of a body of an outer wrap such that a rearward wall of an enclosure of the electrochemical cell lies flat on an inner surface of the outer wrap body and a side wall of the electrochemical cell is substantially aligned with a fold of the outer wrap body; folding, at the fold, a first portion of the outer wrap body over the electrochemical cell such that a flame barrier disposed on the first portion contacts a forward wall of the enclosure; and folding a second portion of the outer wrap body onto the first portion of the outer wrap body. One aspect of this embodiment further comprises removing a protective liner from a tape strip attached to the second portion and securing the second portion to the first portion using the tape strip. Another aspect further comprises at least partially encapsulating the outer wrap body with a polymeric resin, the polymeric resin configured to rupture to direct gases away from the electrochemical cell during an off gassing event.

In yet another embodiment, the present disclosure provides a cell assembly group, comprising: a plurality of cell assemblies, each cell assembly including an electrochemical cell and an outer wrap surrounding the electrochemical cell;

a foam sheet positioned adjacent one side of one cell assembly of the plurality of cell assemblies; a plurality of heat plates, each heat plate being positioned between two cell assemblies of the plurality of cell assemblies; and at least one spacer positioned between one heat plate of the plurality of heat plates and one cell assembly of the plurality of cell assemblies; wherein each outer wrap of each cell assembly of the plurality of cell assemblies includes a body having an inner surface that engages a rearward wall of the electrochemical cell of the cell assembly, a first portion having a flame barrier that engages a forward wall of the electrochemical cell of the cell assembly, and a second portion that engages an outer surface of the first portion. In one aspect of this embodiment, at least one of the plurality of heat plates are formed from aluminum. In another aspect, each of the plurality of heat plates extends around at least three sides of the electrochemical cell. In still another aspect, each of the plurality of heat plates is thermally coupled to a housing containing the cell assembly group. Yet another aspect of this embodiment further comprises a polymeric resin at least partially encapsulating the plurality of electrochemical cells and the plurality of heat plates. In a variant of this aspect, during an off gassing event of any one or more of the plurality of electrochemical cells, the polymeric resin is configured to rupture to direct gases away from the one or more of the plurality of electrochemical cells. In still another aspect, another side of the one cell assembly is positioned adjacent one side of a first heat plate, another side of the first heat plate is positioned adjacent one side of a first spacer, another side of the first spacer is positioned adjacent one side of a second cell assembly of the plurality of cell assemblies, another side of the second cell assembly is positioned adjacent one side of a second heat plate, another side of the second heat plate is positioned adjacent one side of a third cell assembly, another side of the third cell assembly is positioned adjacent one side of a third heat plate, and another side of the third heat plate is positioned adjacent one side of a second spacer. In another aspect, the second portion of each outer wrap includes a tape strip that engages the outer surface of the first portion to secure the second portion to the first portion. In a variant of this aspect, each tape strip is formed from an acrylic based material. In a further variant, each tape strip is positioned adjacent a first side edge of its corresponding outer wrap and each flame barrier is positioned adjacent a second, opposite side edge of the corresponding outer wrap. In yet another aspect of this embodiment, the electrochemical cell of each cell assembly is a lithium ion cell having at least a 45 amp/hour rating. In another aspect, each outer wrap includes a body formed from aramid fiber material having a thickness of at least 0.007 inches. In another aspect, the flame barrier of each outer wrap is formed from a ceramic coated polyethylene terephthalate sheet having a thickness of at least 0.006 inches. The present disclosure also provides a cell module assembly, comprising a plurality of cell assembly groups according to this embodiment.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 9 is a side view of one cell unit as shown in FIG. 5 and having an outlet as depicted prior to a thermal runaway event;

FIG. 10 is a side view of the cell unit as shown in FIG. 5 depicting gasses being expelled through the outlet during a thermal runaway event;

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items.

Lithium ion battery (LIB) packs have many uses as lead-acid replacement systems including, for example, in material handling forklift applications, vehicle applications, modular battery systems, stationary energy storage systems, and other electrical energy storage applications. For such applications, long life, zero maintenance battery pack systems for heavy/medium duty cycle use applications are needed. Thermal runaway mitigation systems need to be effective and reliable to ensure safe usage of such devices. A modular system design is advantageous to provide LIB pack capacities tailored to customer needs.

Each LIB pack includes at least one cell module assembly (CMA). The pack may come in various arrangements referred to as cell stack configurations. The battery pack cell stack configuration may include one or more CMAs, for example, from about three to about seven CMAs per cell stack. In addition to the different cell stack configurations, each of the CMAs may be supplied with or without resistive cell heaters, depending on whether the application requires cold temperature operation.

Figure 1:
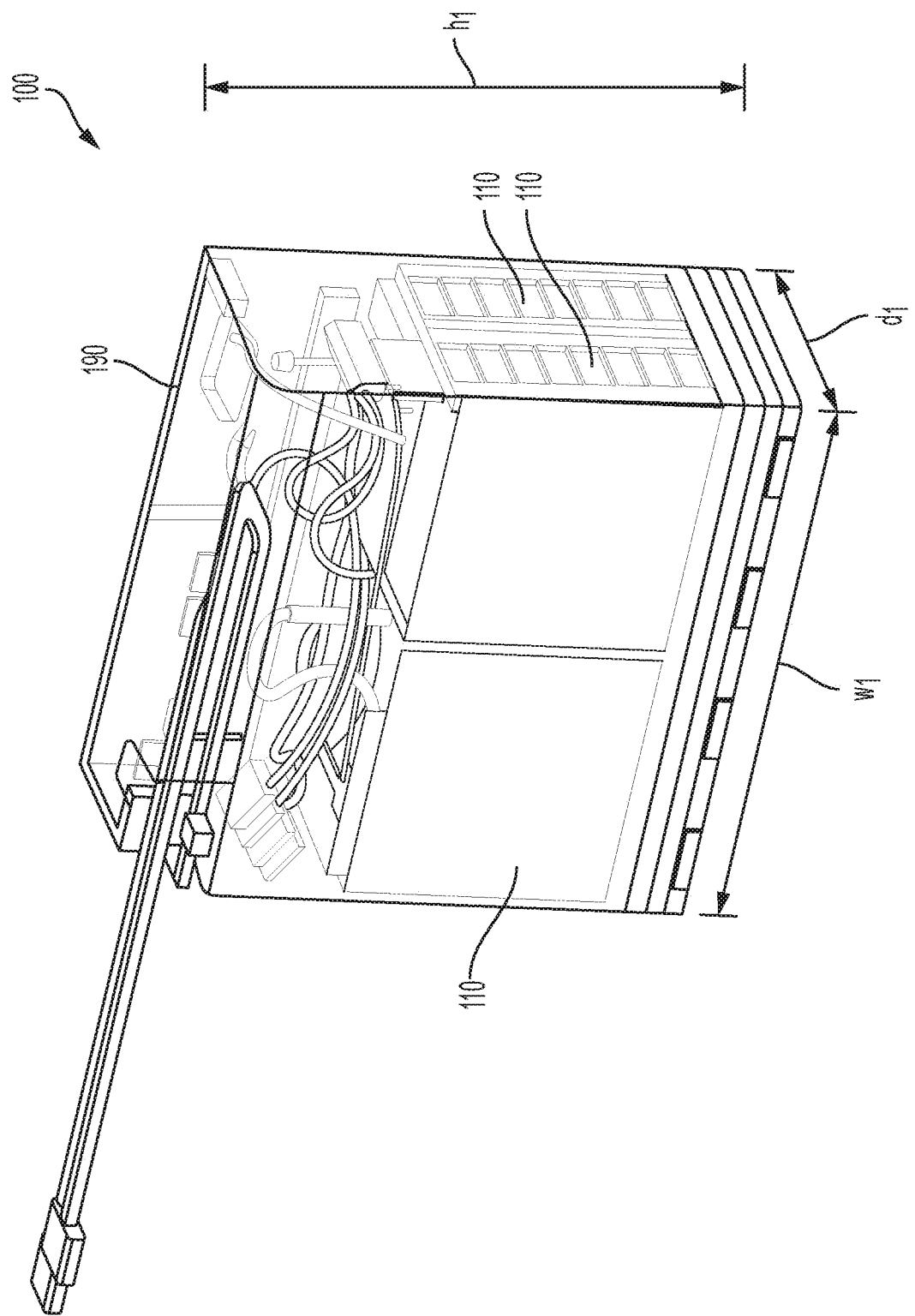
FIG. 1 is a perspective view of an embodiment of a battery pack of the present disclosure.
Figure 2:
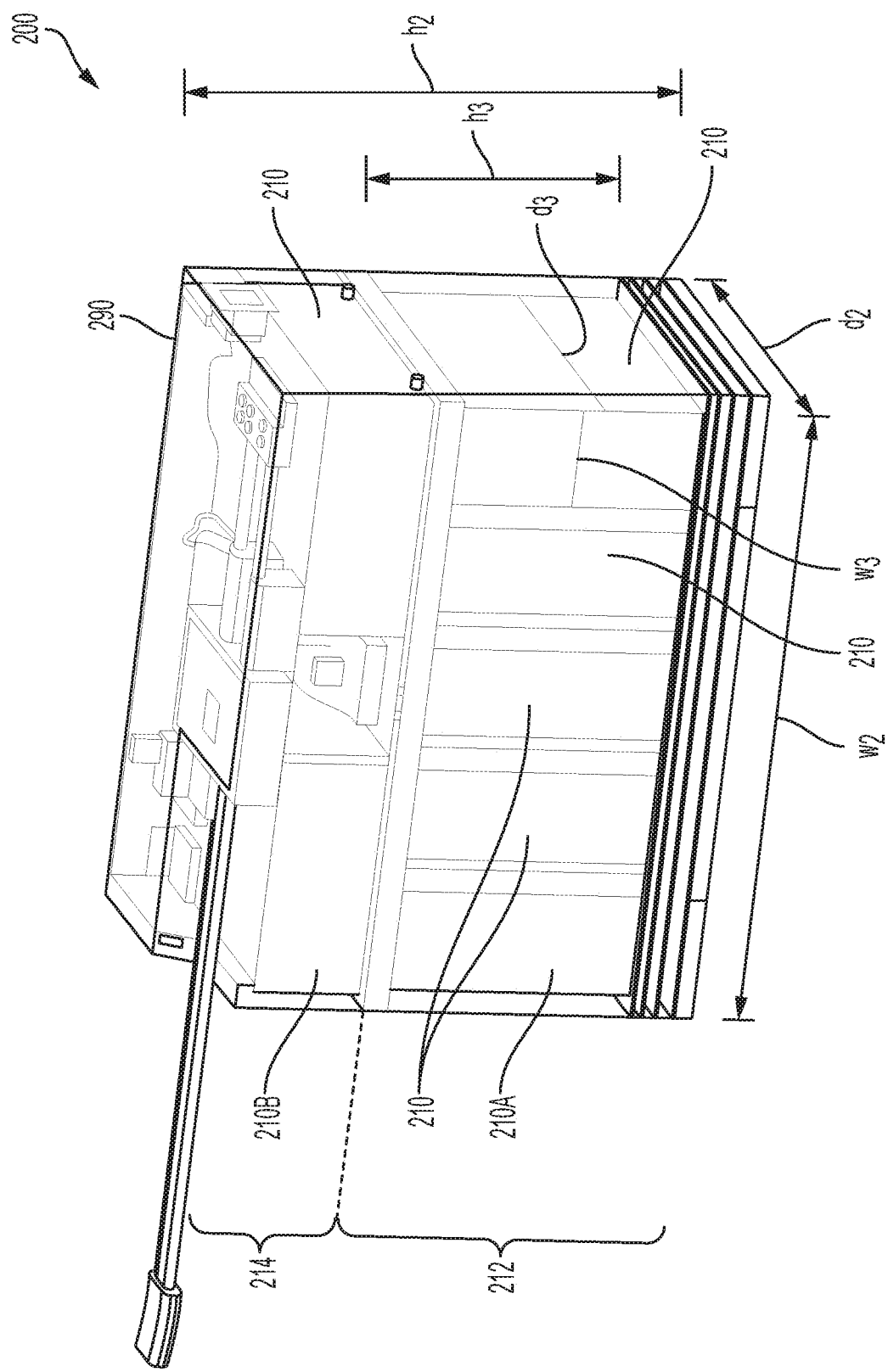
FIG. 2 is a perspective view of an alternate embodiment of a battery pack of the present disclosure.

FIGS. 1 and 2 depict embodiments of battery pack devices according to the present disclosure wherein different cell stack arrangements are utilized. For example, FIG. 1 depicts a battery pack 100 including CMAs 110, configured in a two by two, single-layer arrangement. Battery pack 100 has width w1, depth d1, and height h1. As shown in FIG. 1, the CMAs 110 are disposed adjacent to each other with two CMAs 110 across width w1 and two CMAs 110 across depth d1. Height h1 accommodates one CMA 110 with additional room available for components and circuitry as required for battery pack 100 to provide power to the heavy/medium duty cycle use application.

Battery packs according to the present disclosure may include CMAs in a single layer as in FIG. 1 or in more than one layer. Each CMA may be disposed in any direction as fits the configuration and packaging needs of the battery pack. In another example, as shown in FIG. 2, a battery pack 200 is depicted including seven CMAs 210 configured in a multi-layer arrangement such five CMAs disposed in layer 212 and two CMAs disposed in layer 214. Battery pack 200 has width w2, depth d2, and height h2. As shown in FIG. 2, CMAs 210 each include width w3, depth d3, and height h3. In the first or bottom layer 212, CMAs 210 are disposed adjacent to each other with five CMAs 210, each having width w3, across battery pack width w2, and one CMA 210, having depth d3, across battery pack depth d2. In the second or top layer 214, CMAs 210 are disposed adjacent to each other, but in a different orientation than the CMAs of layer 212. For example, battery pack height h2 accommodates CMAs 210A and 210B, disposed in layers 212 and 214, respectively. CMA 210A is disposed within layer 212 such that height h3 is accommodated by height h2, and CMA 210B is disposed within layer 214 such that width w3 of CMA 210B is also accommodated by height h2 of battery pack 200. Height h2 also includes clearance for components and circuitry as required for battery pack 200 to provide power to the heavy/medium duty cycle use application. As FIGS. 1 and 2 illustrate, the number and configuration of CMAs (e.g., 110 and 210), as well as the orientation of same across one or more layers as needed, are variable within battery packs according to the present disclosure.

While the construction of each CMA (e.g., 110 and 210) may be similar, using the same general design features and assembly methods, each CMA may have a different arrangement of parts due to packaging requirements. Generally, assembled CMAs are potted in an encapsulation material to seal and ruggedize them for the harsh application, the encapsulation of which is described in International Publication No. WO 2017/176462 incorporated in its entirety by reference herein. The encapsulation material may be polymeric resin or epoxy, such as an epoxy phenolic resin, or any other suitable thermoset material. Epoxy phenolic resins are phenolic resins modified at the phenolic hydroxyl group to include an epoxide functional group (usually a —CH2—(C2H3O) group, where —(C2H3O) is the three-membered epoxide ring).

The CMA, submerged within the epoxy, may include a repeating stack of materials designed to support requirements to provide a thermal event mitigation system. Materials requirements include: fire containment in the event of a single cell thermal runaway event, heating of cells for operation in cold ambient conditions, cooling of cells when hot, compression of cells to ensure appropriate cell laminate spacing and electrolyte distribution, compliance to allow cell growth and expansion effects to be accommodated as cells age, and thermistors to sense cell stack temperatures at the hottest and coldest locations in the stack. The cells referred to may be lithium ion cells.

Figure 3:
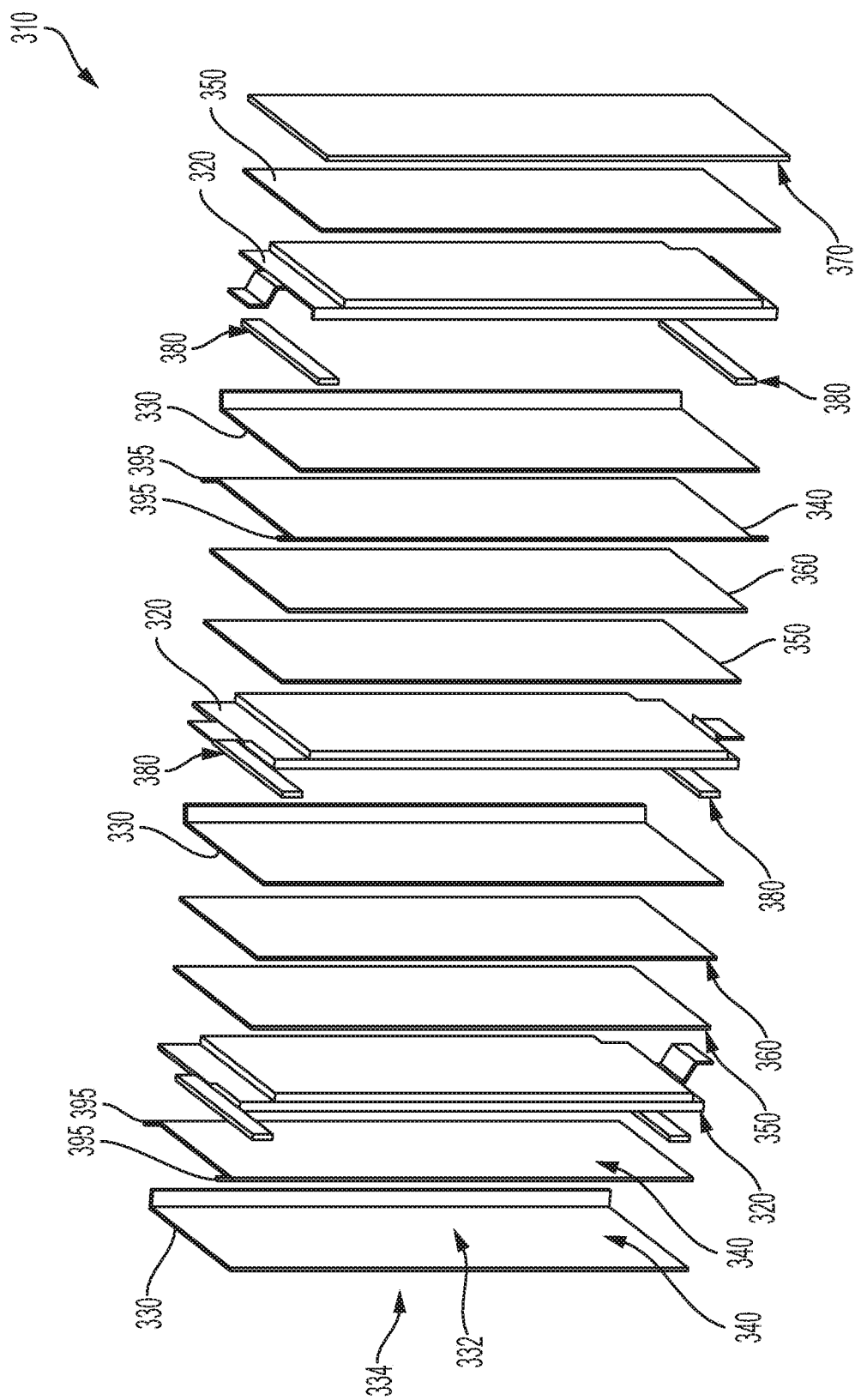
FIG. 3 is an exploded view of a cell assembly group according to one embodiment of the present disclosure and configured to be included in the battery packs of FIGS. 1 and 2.

FIG. 3 depicts an exploded view one embodiment of a cell assembly group 310 according to the present disclosure. It is understood that the layers as depicted in FIG. 3 may be disposed adjacent one another such that a laminate or laminate stack is formed suitable for encapsulating with encapsulation material as described above. Each cell assembly group 310 includes at least one electrochemical cell 320, which may be a lithium ion cell. As shown in FIG. 3, cell assembly group 310 is configured for packaging within a CMA comprising a non-limiting example of three lithium ion cells 320.

Figure 5:
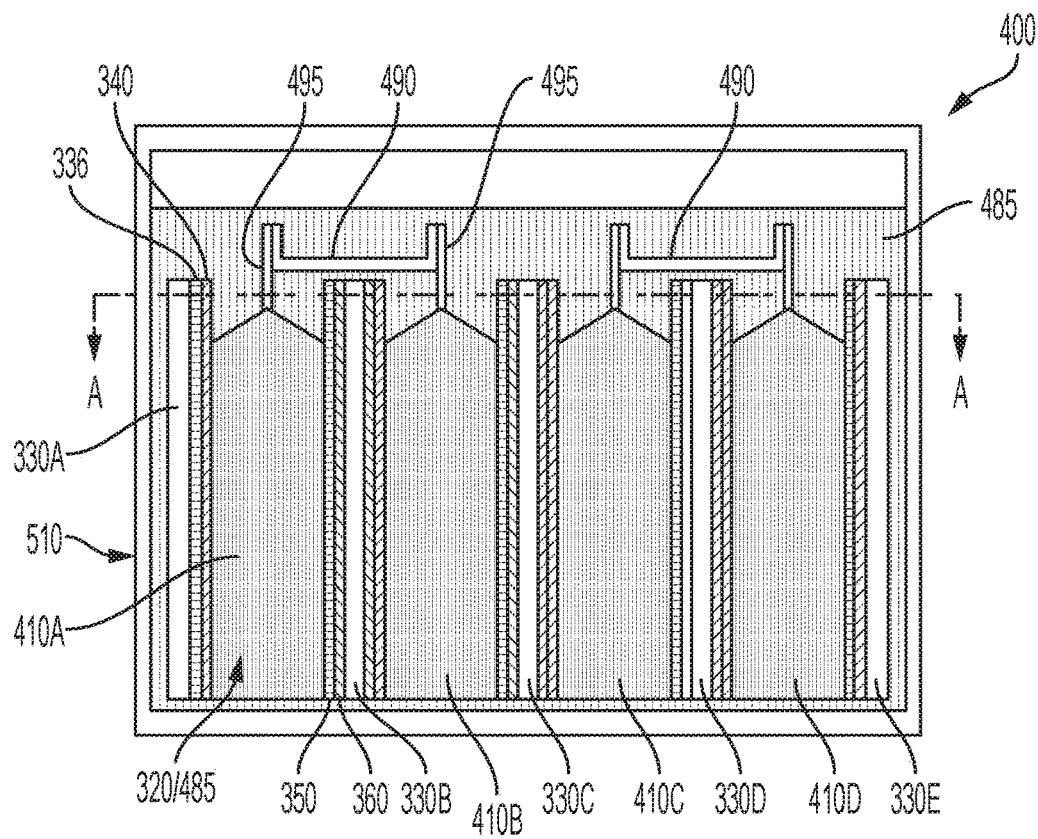
FIG. 5 is a cross-sectional side view of another embodiment of a battery pack of the present disclosure.
Figure 6:
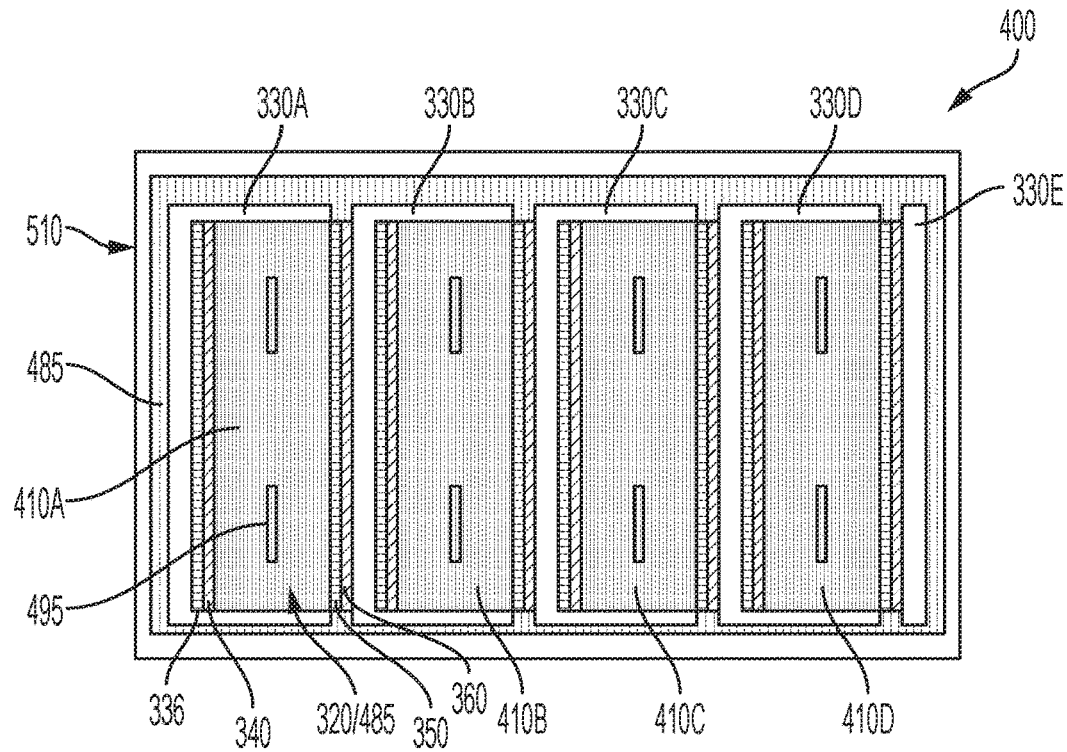
FIG. 6 is a top view of the battery pack depicted in FIG. 5.

Cell assembly group 310 further includes at least one heat plate 330. Heat plate 330 may be a plate comprised of aluminum, steel, or other thermally conductive material having a thickness from about 0.02 inch (about 0.5 mm) to about 0.07 inch (about 1.8 mm). Exterior closure or housing 510, as shown in FIGS. 5 and 6, surrounds the cell assembly group 410(A-D), and heat plates 330(A-E) are coupled to this enclosure. Heat plate 330 has a first planar surface 332 facing toward lithium ion cell 320 and a second planar surface 334, opposite the first planar surface 332 and facing away from cell 320. First planar surface 332 further includes an intumescent coating 336. Intumescent coating 336 may be applied to surface 332 by painting a thin layer as known in the art. Coating 336 has a thickness of from about 0.007 inches (about 0.18 mm) to about 0.020 inches (about 0.51 mm). Intumescent coatings or paint can expand to more than 100 times the original thickness. In one embodiment, intumescent coating 336 expands upon exposure to heat of at least 300° C. thereby acting as an insulator to keep high temperatures away from cell 320. Intumescent coatings typically include expandable graphite or expandable graphite flake. Expandable graphite is manufactured using natural crystalline graphite flake, from sources such as metamorphic rock, or in the silts and clays that result from their erosion. Graphite flake is typically 95-98% carbon. Expandable graphite includes crystalline stacks of parallel planes of carbon atoms. Intercalation during production of expanding graphite includes sulfuric acid inserted into the graphite, the sulfuric acid molecules being intercalated into the lattice because no covalent bonding exists between the carbon layers. An intumescent coating 336 suitable for use in the present disclosure may be comprised of Shield Industries FireGuard E-84. Heat plate 330 having intumescent coating 336 provides a first thermal or fire barrier layer for fire or thermal containment in the event of cell thermal runaway, in other words a thermal runaway event for at least one electrochemical cell 320 in cell assembly group 310.

Referring again to FIG. 3, cell assembly group 310 further includes at least one additional thermal or fire barrier layer. Disposed between the first fire barrier coating, i.e., intumescent coating 336, and electrochemical cell 320 are at least two additional thermal or fire barrier layers 350 and 360. Thermal or fire barrier layers 350 and 360 each provide thermal barrier protection to prevent heat and fire spread with cell assembly group 310. In other words, for cell assembly group 310 having more than one electrochemical cell 320, there are at least three thermal barrier layers disposed between adjacent electrochemical cells 320, namely coating 336, layer 350, and layer 360. In one embodiment, layer 350 may be a ceramic coated polyethylene terephthalate (PET) sheet. Layer 350 comprises a flame barrier sheet comprised of a ceramic coated PET sheet, such as DuPont™ Nomex® XF20 High Temperature Flame Barrier sheet, having a thickness of at least 0.006 inches (about 0.15 mm). In one embodiment, layer 360 may be an un-calendered aramid fiber sheet. Layer 360 comprises a flame barrier sheet comprised of an uncalendared aramid fiber sheet, such as DuPont™ Nomex® Type 411 Flame Barrier sheet, well suited for use in cast resin applications, having a thickness of about 0.018 inches (about 0.46 mm). Layers 350 and 360 are insulating thermal barrier layers providing further thermal containment in the event of cell thermal runaway. The combination of layers of thermal barrier sheets and intumescent paint, i.e., coating 336 and layers 350 and 360, are strategically applied around each cell 320 to provide flame or thermal containment and insulation during a cell thermal runaway event and/or to provide isolation of any thermal runaway event should it occur. Intumescent coating 336 serves as a thermally conductive layer to allow heat to sink into the heat plates 330. In a thermal runaway event of at least one cell 320 resulting in fire or flame, coating 336 expands to insulate the cell 320 from affecting and causing any of the plurality of neighboring cells to combust. Layer 350 acts as an impenetrable flame barrier for the duration of cell combustion, preventing flames from directly impinging on neighboring cells 320. Layer 360 acts as insulation layer, and is un-calendared to ensure maximum air gaps between fibers to further improve insulation properties. Coating 336 is advantageously applied directly to the heat plate 330 in one embodiment because it can conduct heat in an inactive state, but act as an insulator upon activation. Layer 350, having a ceramic coated side facing toward cell 320, serves as a direct barrier for the cell to contain any flames, and layer 360 provides insulation disposed next to layer 350. The three layers effectively act in combination to mitigate or isolate any thermal runaway event.

Figure 4:
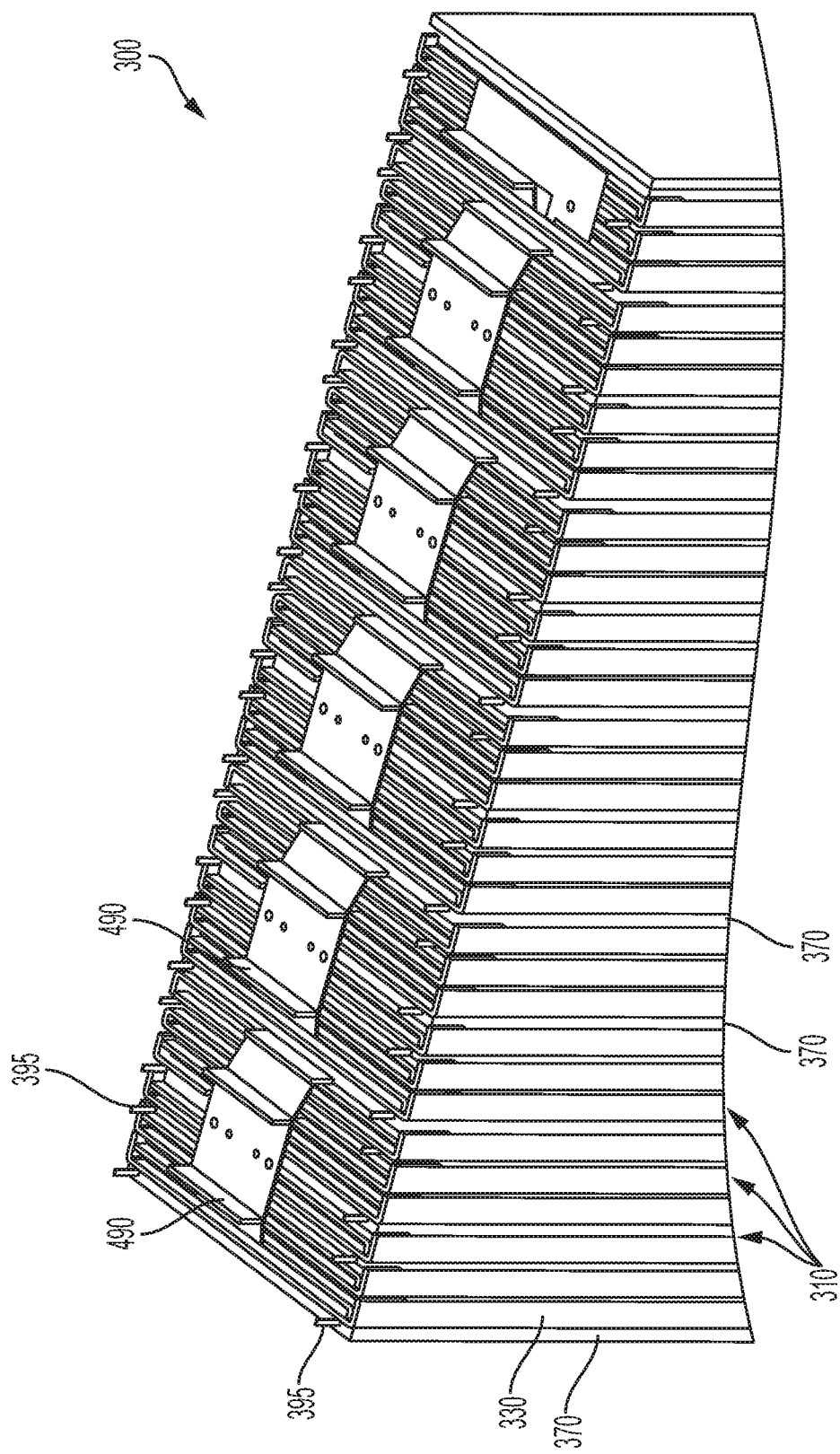
FIG. 4 is a perspective view of a cell assembly groups (as shown in FIG. 3) connected by busbars.

Optionally, cell assembly group 310 further includes at least one resistance heater 340 disposed adjacent to at least one heat plate 330. Heater 340 provides heating of electrochemical cells 320 when operating in cold ambient conditions. Each heater 340 is advantageously placed interior to the stack outer walls (e.g., plate 330 or barrier layer 350 as shown in FIG. 3). Placement of the at least one resistance heater 340 within the cell assembly group 310 heats cells 320 to operational temperatures (e.g., about 10° C.) when in cold-temperature ambient conditions. Each heater 340 contains redundant solid-state thermostatic switches which self-regulate the heater temperature to prevent overheating of each cell 320. Heater 340 may be positioned facing first surface 332 having coating 336 of heat plate 330, or alternatively facing second surface 334 of heat plate 330. In one embodiment, two heaters 340 within the cell assembly group 310 are sufficient to provide heat as needed to three cells 320. Optional heaters 340 operate on the battery stack voltage via distribution busbars 490 (as shown in FIG. 4), and each heater has a wire 395 for attaching to each B+ and B− busbar (not shown). The B+ and B− busbars run the length of each side of the cell assembly group 310, and connect the heater wires 395 to either Batt+ or Batt−, depending on which side the wire exits (refer to FIG. 4).

Cell assembly group 310 further provides cooling of electrochemical cells 320 when hot. Because each cell 320 is mounted adjacent to heat plate 330, plate 330 allows heat to be transmitted, either through conduction or convection, to the device housing (e.g., housing 190 as in FIG. 1 and housing 290 as in FIG. 2). This passive system cools by transmitting heat from the stack of cell assembly groups 310.

Battery pack devices according to embodiments of the present disclosure may further include at least one silicone foam sheet 370 distributed through each cell assembly group 310. The at least one silicone foam sheet 370 provides compression to cell assembly group 310 and ensures appropriate cell laminate spacing and electrolyte distribution. The electrolyte is contained within the cell pouch, and does not interact with the silicone foam. Silicone foam sheets 370 are distributed throughout the device to provide mechanical compliance to the cell stack arrangement, thereby producing compression on the cell assembly group 310 once the stack is squeezed together during assembly. Compliance provided by sheets 370 also accommodates cell growth and expansion effects as a result of aging of electrochemical cells 320 as well as use. Cell assembly groups 310, as shown in FIG. 3, each having a plurality of electrochemical cells 320, are grouped together in FIG. 4. Cell assembly groups 310 are connected via busbars 490. Silicone foam sheets 370 may be distributed between each cell assembly group 310. Optional foam strips 380 may be provided to act as gas expansion seals to allow cells 320 a flexible region into which they may expand and that is not rigid resin 485.

Cell assembly group 310 further optionally include thermistors. Thermistors (not shown) may be used to sense device stack temperatures at the hottest and coldest locations in the stack. Two sets of redundant thermistors are located at the cold and hot spots of the cell assembly group, in order to allow a Battery Monitoring System (BMS) to read and determine if cells are at operational and balanced temperatures.

FIG. 5 depicts a side view of a battery pack 400 having at least one cell assembly 410 according to the present disclosure. For example, battery pack 400 includes four cell assemblies labeled as 410A, 410B, 410C, and 410D. Cell assemblies 410 are ultrasonically welded together using busbars 490, which may be comprised of, for example, copper. Within each cell assembly (e.g., 410A) is a PC board assembly or Battery Monitoring Unit (BMU) (not shown), which contains the cell monitoring and maintenance circuitry. The BMU may do at least one of the following: sense thermistor temperatures, enable/disable heaters, sense cell voltages, passively balance the cells, coulomb count transported charge, measure CMA current, and transmit this data to a Battery Management Controller (BMC) which oversees operation of battery pack 400. The BMU communicates via a common CAN bus network distributed to all other cell assemblies (e.g., 410B, 410C, and 410D).

FIG. 6 is a top cross-sectional view of a plane coincident with line A-A of FIG. 5. Each cell assembly 410 (e.g., 410A, 410B, 410C, and 410D) represents of group of electrochemical cells 320. In other words, each cell assembly 410 includes a plurality of electrochemical cells 320 (as shown in FIG. 3). Each cell assembly 410 may further comprise at least one heat plate 330, which may include intumescent coating 336, optional heater 340, and at least one fire barrier layer 350 and/or 360. Cell assembly 410A includes heat distributer 330A and resin 485, which together may encapsulate cell assembly 410A. In one embodiment, heat plate 330A may extend around at least three sides of the cell assembly 410A, as shown in top view FIG. 6. Similarly, heat plates 330B, 330C, and 330D may extend around at least three sides of cell assemblies 410B, 410C, and 410D, respectively. Heat plate 330E at least partially encapsulates cell assembly 410D, for example. The heat plates 330(A-E) provide a fire wall between cell assemblies 410(A-D) to isolate the cell assemblies in case of an off gassing or thermal runaway event in which at least one of a plurality of electrochemical cells 320 experiences a high temperature contributing to combustion of at least a portion of the cell assembly. Further isolating any thermal runaway event in one cell assembly 410(A-D) from adjacent cell assemblies 410 is the inclusion of one or more thermal barrier layers within cell assembly 410(A-D) and/or at least one exterior side of the cell assembly. For example, thermal barrier layers (as described for FIG. 3), such as thermal barrier layers 350 and/or 360, are disposed between the at least one cell assembly (e.g., 410A) and the heat plate 330B of cell assembly 410B. The combination of thermal barrier layers in the battery pack 400, which may include intumescent layers 336, thermal barrier layers 350, and thermal barrier layers 360, provides isolation of any thermal runaway event in at least one of the plurality of electrochemical cells 320 to the cell assembly 410(A-D) in which the event originated.

Figure 7:
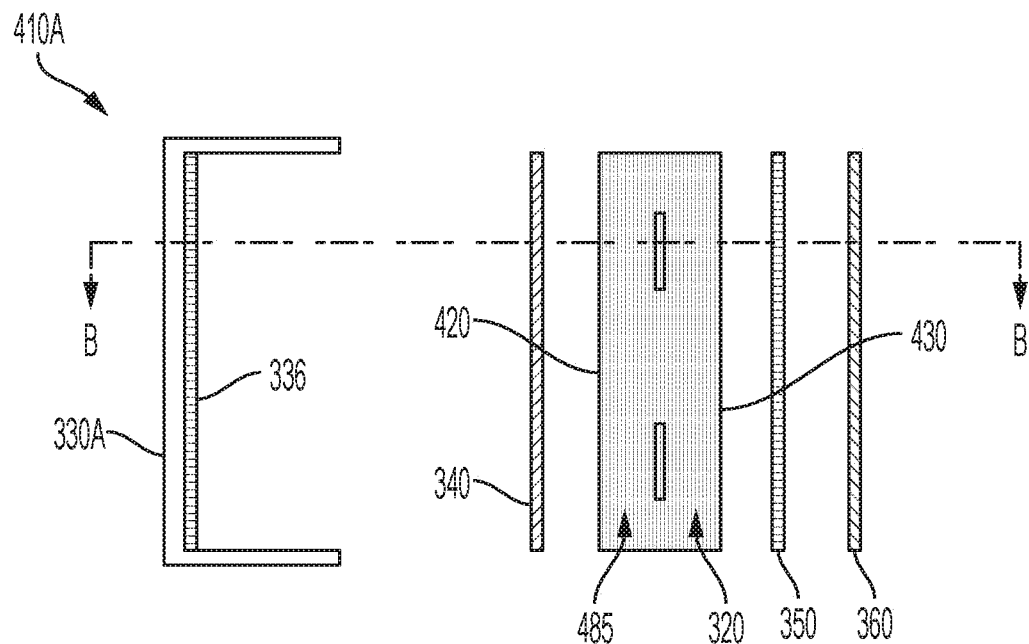
FIG. 7 is an exploded top view of a section taken along line A-A of the battery pack depicted in FIG. 5.

FIG. 7 is an exploded top view of a portion (e.g., cell assembly 410A) along the plane coincident with line A-A of the battery pack depicted in FIG. 5. Cell assembly 410A comprises a first electrochemical cell 320 having a first surface 420 and a second surface 430 opposite first surface 420. Intumescent layer 336 is coated onto a surface of heat plate 330A that faces cell surface 420. Optional heater 340 is further disposed between intumescent layer 336 and surface 420. Adjacent opposite surface 430 of cell assembly 410A is disposed first thermal barrier layer 350 and second thermal barrier layer 360. The cell assembly depicted in FIG. 6 comprises a laminate for thermal runaway event isolation. Any thermal runaway event originating in cell 320 in cell assembly 410A does not affect any adjacent cell assembly (e.g., system 410B of FIGS. 5 and 6).

Figure 8:
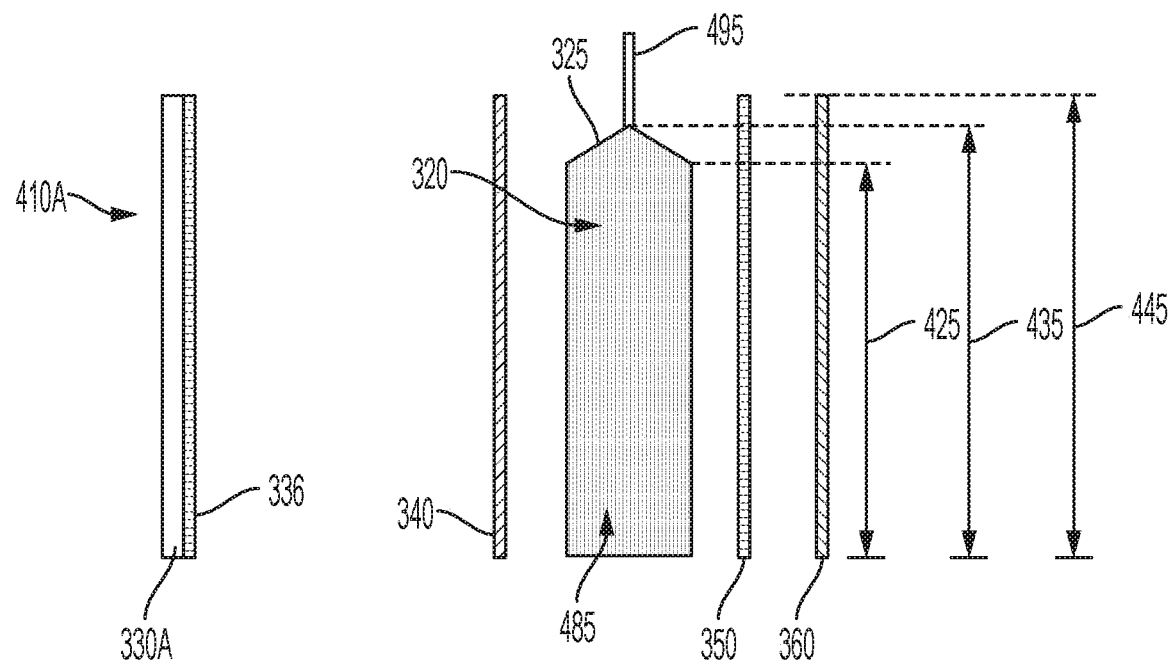
FIG. 8 is an exploded side view of a section taken along line B-B of the battery pack depicted in FIG. 7.

FIG. 8 is a corresponding exploded side view of the portion of the battery pack depicted along a plane coincident with line B-B of FIG. 7. In cell assembly 410A, the layers extend vertically to a distance past the top of the resin 485 encapsulating a plurality of electrochemical cells 320. For example, fire barrier layers (e.g., 336, 350, and 360) each extend to a distance 445 which is greater than the distance 425 where the top 325 of resin 485 tapers to meet cell foil tab 495 at distance 435.

FIG. 9 is a side view of one cell assembly (e.g., 410A) as depicted in FIG. 3, and FIG. 10 is a side view of the same cell assembly as shown in FIG. 9 during an out gassing event in which gasses are expelled through the outlet, which may be a rupture area 505. An out gassing event may include a thermal runaway event wherein at least one of the plurality of electrochemical cells 320 with the system experiences high heat to produce combustion. The combustible gases are transmitted away from the fire barrier layers (e.g., 336, 350, and 360) and polymeric resin 485 ruptures as a result of pressure build up of combustible gases within the system. The gases 500 are directed from the rupture area 505 upward and outward away from any adjacent cell assemblies (e.g., 410B). Forced outgassing occurs in an upward direction as shown in FIG. 10. This is achieved by purposely designing the cell assembly structure to fail in this direction during combustion when pressure is rapidly building within a cell.

Figure 11:
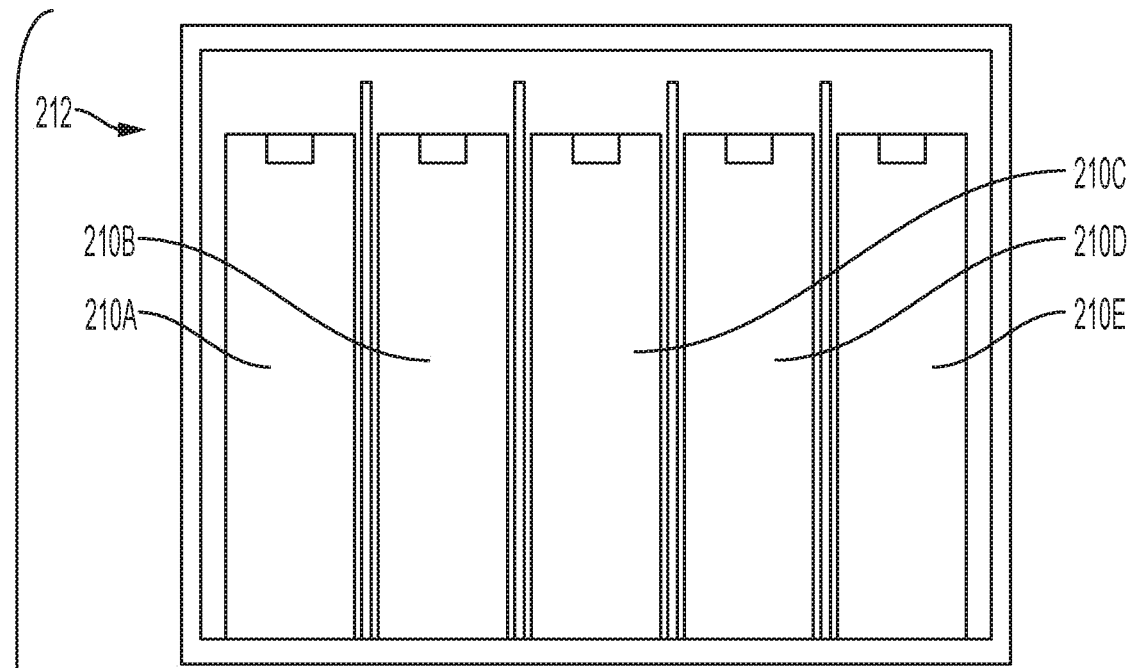
FIG. 11 is a section view depicting the five cell assembly groups disposed in a lower layer of the battery pack shown in FIG. 2.

FIG. 11 is a section view depicting the five cell assemblies disposed in layer 212 of the battery pack shown in FIG. 2.

A method of thermal runaway mitigation according to the present disclosure includes providing at least one cell assembly group, wherein each group includes a plurality of electrochemical cells. The method further includes disposing at least one heat plate between each cell assembly of the cell assembly groups. The method further includes disposing at least one fire barrier layer between the heat plate and at least one of the plurality of electrochemical cells. The method includes at least partially encapsulating the at least one cell assembly group and the at least one heat plate with a polymeric resin, the polymeric resin configured to rupture to direct gases away from the plurality of electrochemical cells during an off gassing event of one or more of the plurality of electrochemical cells.

Referring now to FIGS. 12-21, the following description provides details of alternative embodiments of a CMA for use in a LIB pack, and in particular provides details of aspects of a cell assembly for use in a CMA. As indicated above, a LIB pack is an overall battery system for storing electrical power for use by a system such as a vehicle, although LIB packs may be used in many applications. A LIB pack includes at least one CMA, in addition to a number of other components. A CMA includes at least one cell assembly including an electrochemical cell in addition to a variety of other components as described herein, including an outer wrap in the embodiments described below. A cell is a device capable of either generating electrical energy from chemical reactions or facilitating chemical reactions through the introduction of electrical energy. In the disclosed embodiments, the cell(s) assembled into a CMA include an outer wrap to mitigate thermal runaway as described herein. Each cell including the outer wrap is referred to below as a cell assembly.

Figure 12:
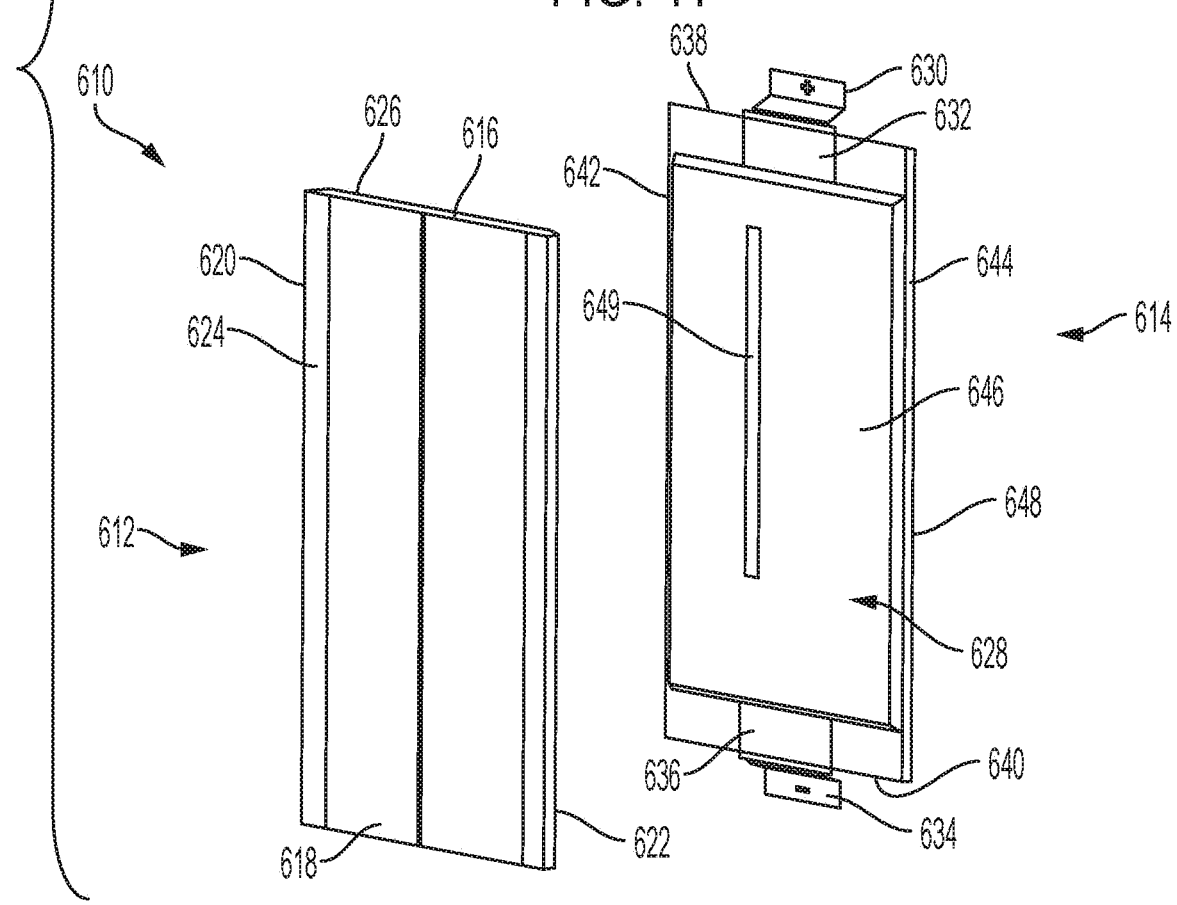
FIG. 12 is a perspective view of components of a cell assembly including an outer wrap and a cell according to one embodiment of the present disclosure.

Referring now to FIG. 12, a disassembled cell assembly 610 is shown. Cell assembly 610 generally includes an outer wrap 612 and a cell 614. Outer wrap 612 is depicted in FIG. 12 in a folded state as if it were folded around cell 614 in the manner described below. As shown in this folded state, outer wrap 612 includes an upper opening 616, a lower opening 618, a first fold edge 620, a second fold edge 622, a first outer surface 624, and a second outer surface 626.

Cell 614 generally includes an enclosure 628, a positive electrode 630 coupled to a pad 632, and a negative electrode 634 coupled to a pad 636. Pads 632, 636 are electrically connected to an anode of the battery formed within enclosure 628 and a cathode of the battery formed within enclosure 628 in a manner known by those skilled in the art. Enclosure 628 includes an upper wall 638, a lower wall 640, a first side wall 642, a second side wall 644, a forward wall 646, and a rearward wall 648. In certain embodiments, forward wall 646 of enclosure 628 includes a bar code 649 that identifies cell 614 in a manner known in the art. Cell 614 is, in certain embodiments, a rechargeable lithium ion cell and more specifically a high capacity lithium ion cell having at least a 50 amp/hour rating.

Figure 13:
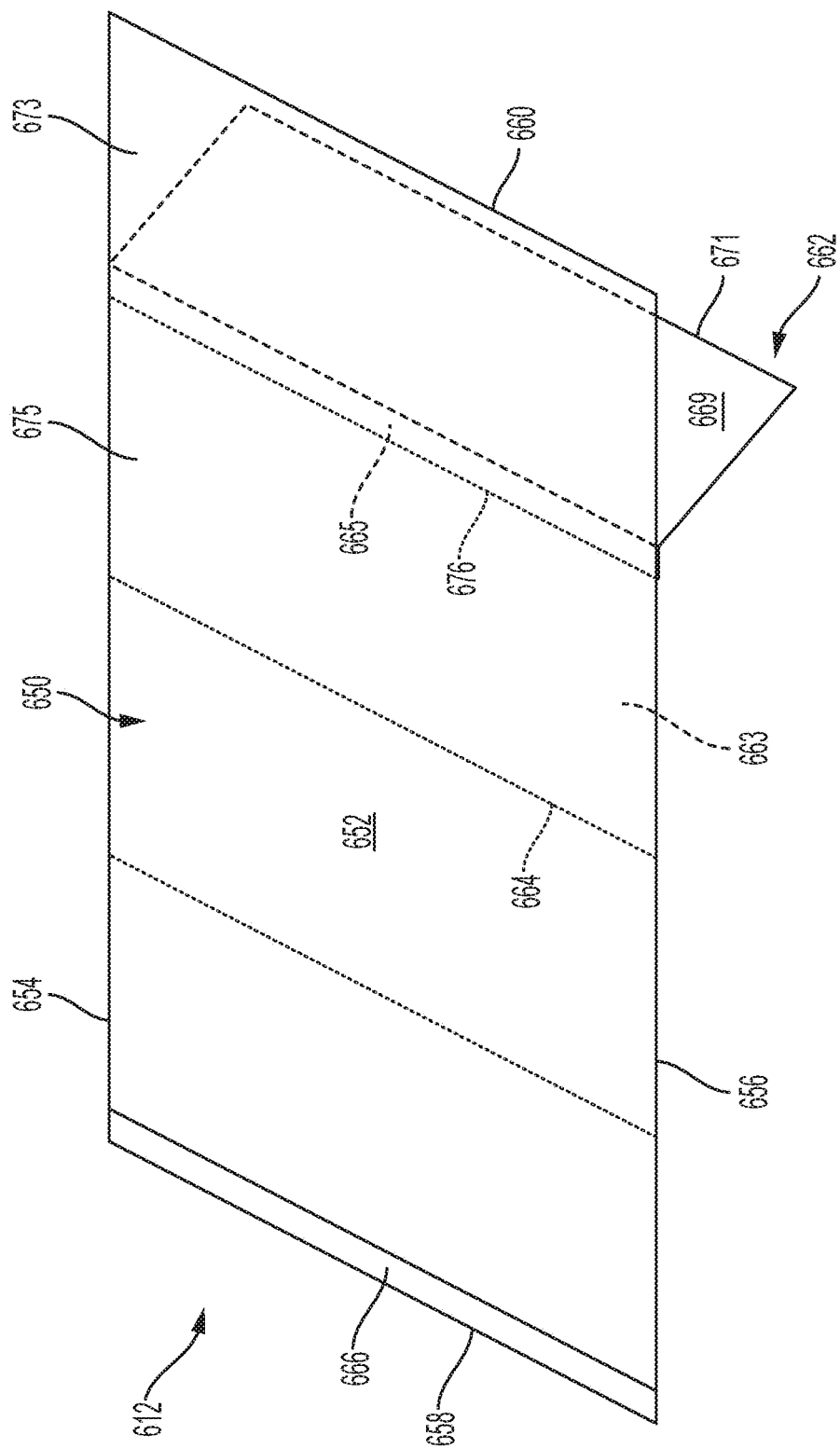
FIG. 13 is a perspective view of the outer wrap of FIG. 12 depicted in an unfolded state.

Outer wrap 612 is depicted in an unfolded state in FIG. 13. As shown, outer wrap 612 includes a body 650 having an inner surface 652, an upper edge 654, a lower edge 656, a first side edge 658 and a second side edge 660. In certain embodiments, body 650 is formed from Nomex® Type 411 material with a sheet thickness of at least 0.007 inches. Nomex® Type 411 material is an aramid fiber material produced by Dupont®. Body 650 further includes a flame barrier 662 applied to an outer surface 663 of body 650. Flame barrier 662 is adhered to outer surface 663 by a tape strip 665 along a first fold 667 of body 650. In certain embodiments, tape strip 665 is an acrylic based adhesive transfer tape such as model 9372W produced by 3M™. Tape strip 665 extends from upper edge 654 of body 650 to lower edge 656 of body 650 and has a width of approximately 0.5 inches, although other widths may be used in variations of the present disclosure. An inner surface 669 of flame barrier 662 is folded flat against outer surface 663 of body 650, and flame barrier 662 is sized such that upon such folding, an outer edge 671 of flame barrier 662 substantially aligns with second side edge 660 of body 650. In certain embodiments, flame barrier 662 is a sheet of Nomex® Type XF20 material produced by Dupont®, which is a gold colored ceramic coated polyethylene terephthalate (PET) sheet having a thickness of at least 0.006 inches. It should be understood, however, that in other embodiments, flame barrier 662 may have a thickness of up to 0.027 inches or less than 0.006 inches. Flame barrier 662 extends between upper edge 654 of body 650 and lower edge 656 of body 650. Flame barrier 662 also extends from side edge 660 to first fold 667 and approximately covers first portion 673 of body 650 which constitutes approximately one-fourth of the area of body 650.

As will be apparent from the following description, the overall area of inner surface 652 is slightly larger than four times the overall area of either forward wall 646 or rearward wall 648 of cell enclosure 628 to accommodate the folding of outer wrap 612 around cell enclosure 628. Body 650 further includes a flame retardant tape strip 666 disposed adjacent side edge 658 of body 650. In certain embodiments, tape strip 666 is substantially the same material as tape strip 665 described above. Tape strip 666 extends from upper edge 654 of body 650 to lower edge 656 of body 650 and has a width of approximately 0.5 inches, although other widths may be used in variations of the present disclosure. A removable protective liner (not shown) is adhered to tape strip 666 to prevent tape strip 666 from adhering to a surface until after the liner is removed.

Figure 14:
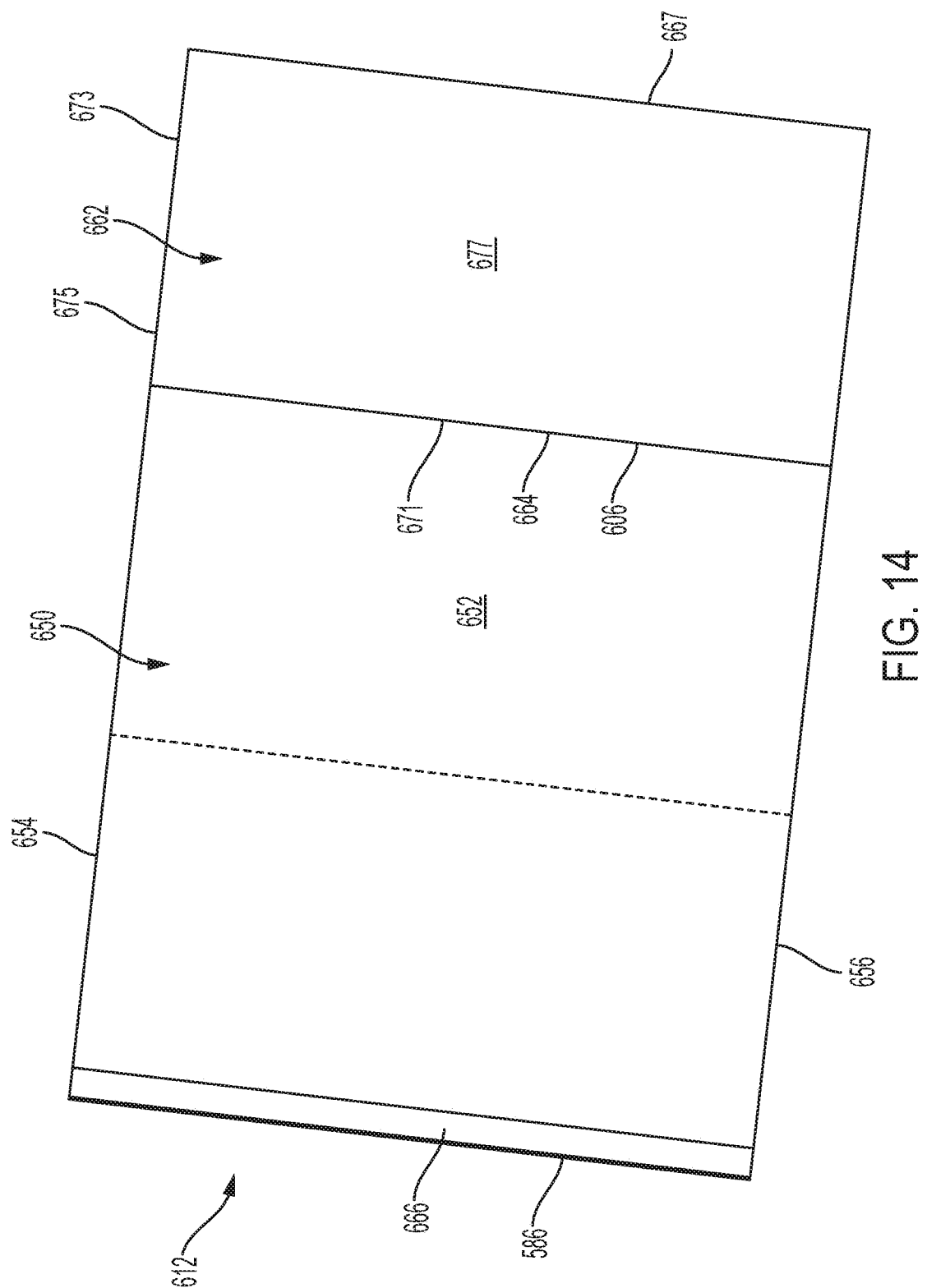
FIG. 14 is a perspective view of the cell of FIG. 12 in a semi-folded state.

Referring now to FIG. 14, a first step in the assembly procedure for forming cell assembly 610 is depicted. As shown, first portion 673 and flame barrier 662 have been folded along first fold 667 onto inner surface 652 of a second portion 675 of body 650. When so folded, outer edge 671 of flame barrier 662 and outer edge 660 of body 650 are substantially aligned with a second fold 664. Also, an outer surface 677 of flame barrier 662 faces outwardly.

Figure 15:
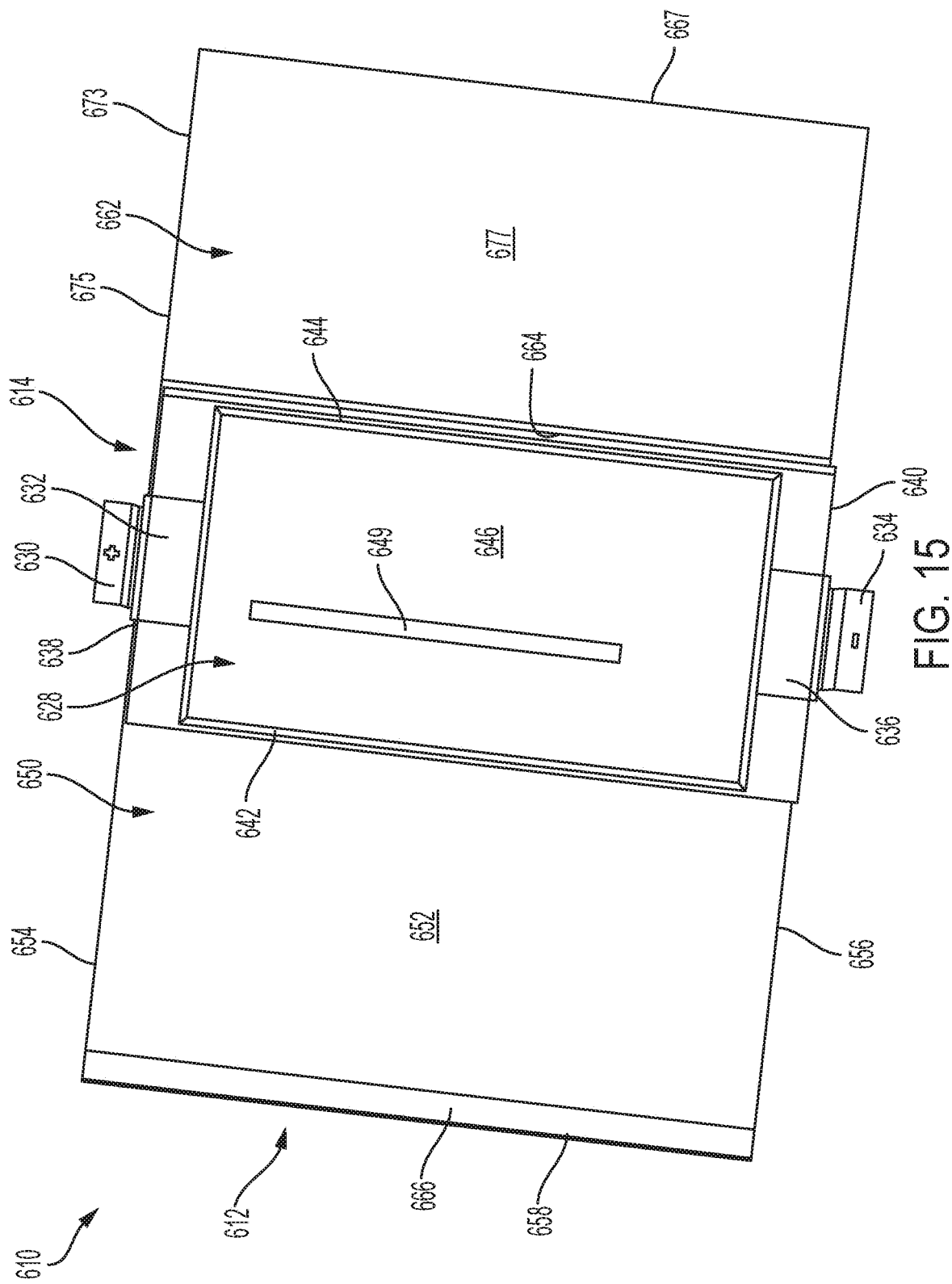
FIG. 15 is a perspective view of the cell of FIG. 12 situated on the semi-folded outer wrap of FIG. 14.

Referring now to FIG. 15, a second step in the assembly procedure for forming cell assembly 610 is depicted. As shown, cell 614 is place onto inner surface 652 of outer wrap body 650 such that rearward wall 648 of cell enclosure 628 lies flat on inner surface 652 of outer wrap body 650. Cell 614 is positioned such that upper wall 638 is aligned with upper edge 654 of outer wrap body 650, lower wall 640 is aligned with lower edge 656, and side wall 644 is substantially aligned with second fold 664, which is slightly spaced apart from flame barrier 662.

Figure 16:
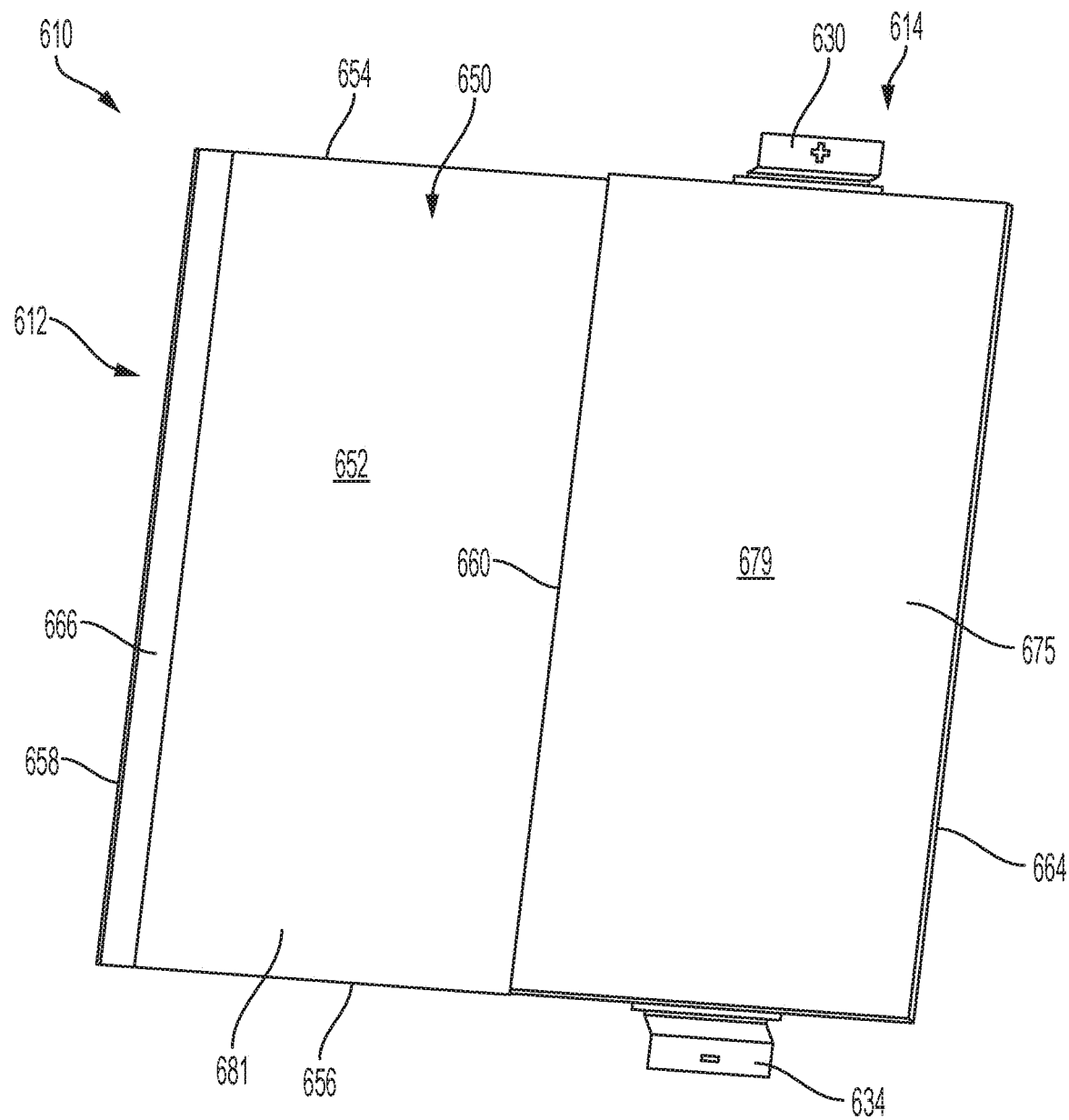
FIG. 16 is a perspective view of the cell of FIG. 12 situated in a further folded outer wrap of FIG. 14.

The next step in the assembly procedure is depicted in FIG. 16. As shown, second portion 675, first portion 673, and flame barrier 662 of outer wrap 612 are folded over cell 614 by folding body 650 at second fold 664 such that outer surface 677 of flame barrier 662 contacts forward wall 646 of cell enclosure 628. When folded as depicted in FIG. 16, an outer surface 679 of portion 675 of outer wrap body 650 is shown.

Figure 17:
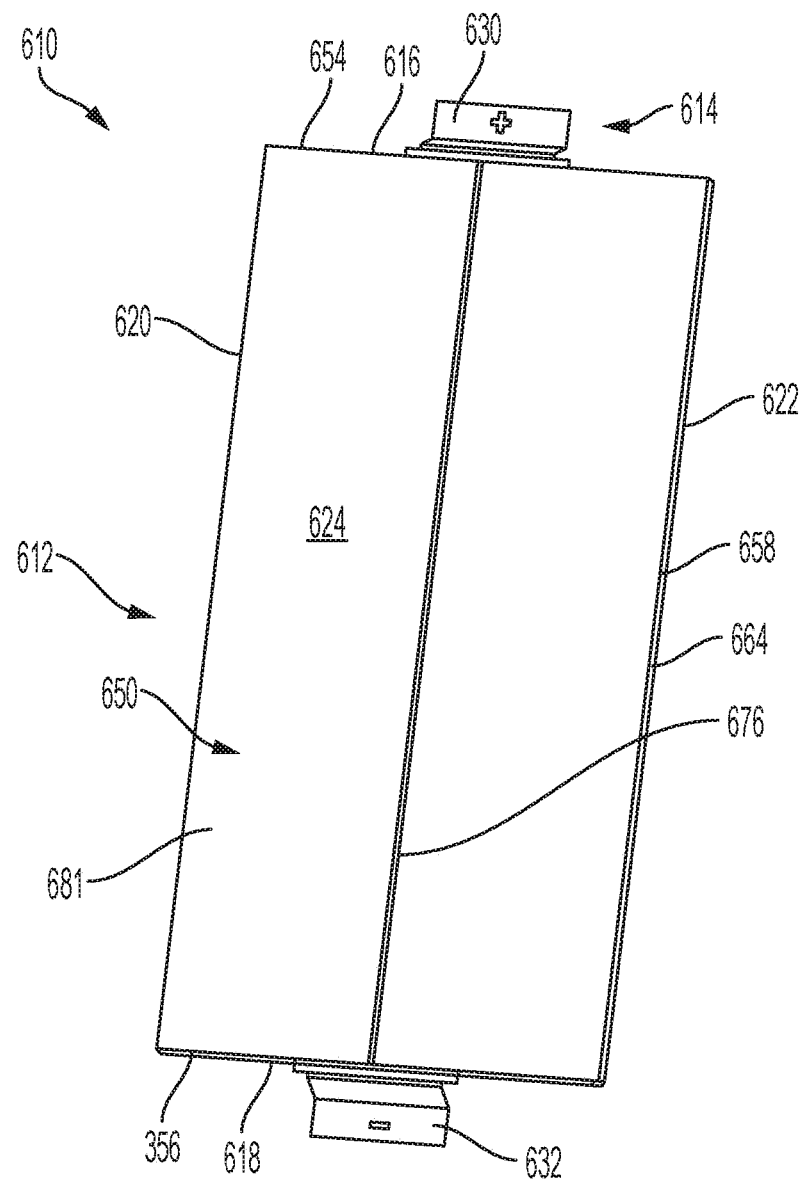
FIG. 17 is a perspective view of a cell assembly according to one embodiment of the present disclosure.
Figure 18:
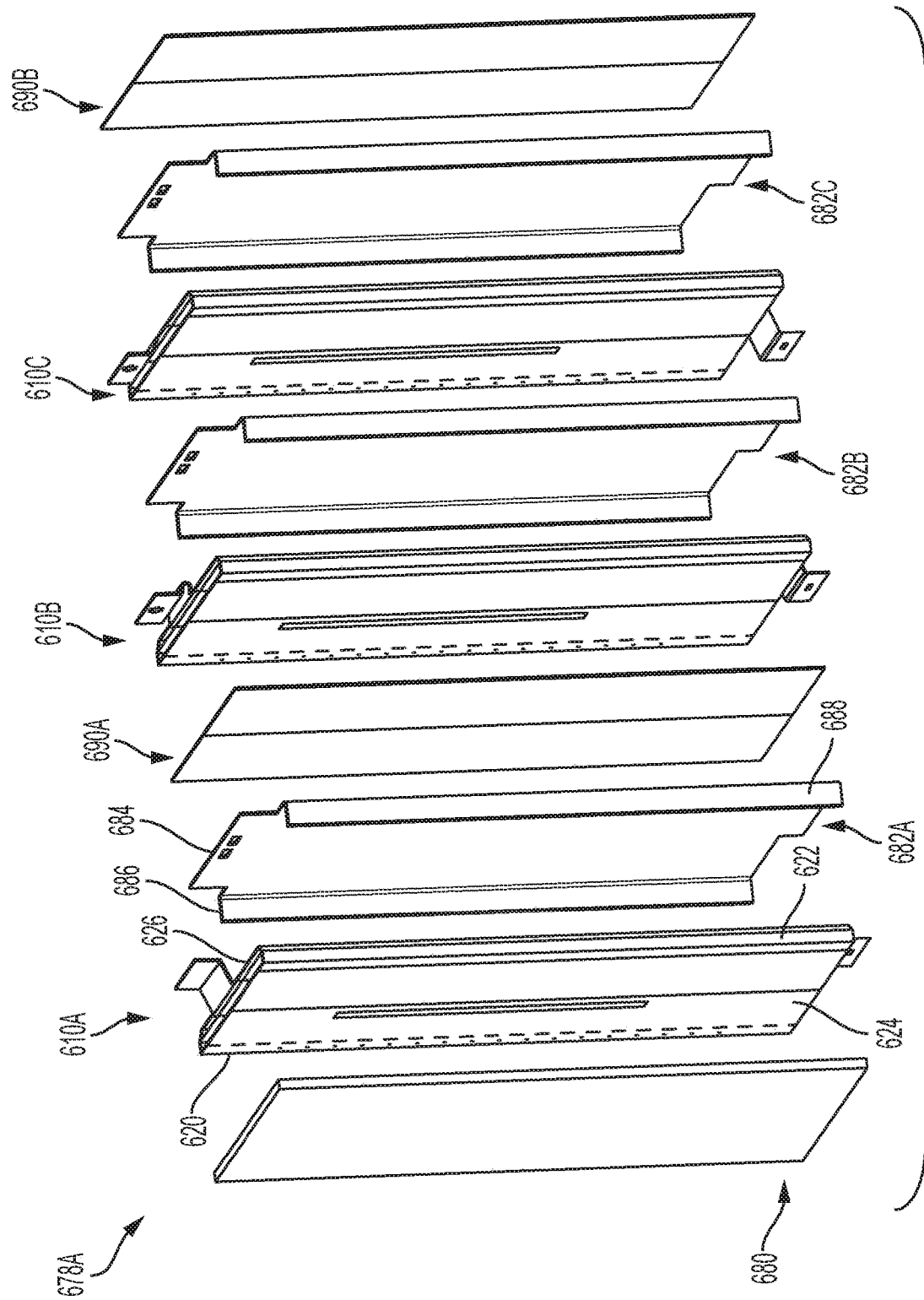
FIG. 18 is an exploded, perspective view of a cell assembly group according to one embodiment of the present disclosure.

Referring now to FIG. 17, a final step in the assembly procedure for cell assembly 610 is shown. In this step, a third portion 681 of outer wrap body 650 is folded onto portion 675 the manner shown. This folding step defines first fold edge 620 of outer wrap 612. When so folded, side edge 658 of portion 681 of outer wrap body 650 is substantially aligned with second fold 664 to define second fold edge 622 of outer wrap 612. As the protective liner of tape strip 666 is removed before the folding step of FIG. 17 is performed, tape strip 666 engages outer surface 679 of portion 675 of body 650 adjacent second fold 664 and secures portion 681 to portion 675. First outer surface 624 of outer wrap 612 is shown having indicia 676 which may be used by an assembly vision system that assembles cell assembly 610 into a cell assembly group as described below. As shown in FIG. 17, electrode 630 protrudes through upper opening 616 of outer wrap 612 and electrode 632 protrudes through lower opening 618 of outer wrap 612.

After cell assembly 610 is assembled in the manner described above, it may be assembled with a plurality of other cell assemblies 610 into a cell assembly group in the manner described below. Specifically, and referring to FIG. 18, in one embodiment cell assemblies 610A-610C are sandwiched together with other spacers and heat-resistant components to form cell assembly group 678A. In the embodiment depicted in FIG. 18, three cell assemblies 610A, 610B and 610C are depicted in an exploded view in the order in which they are packaged with the other components. It should be understood that cell assembly group 678A may include more or fewer cell assemblies 610 than described herein.

In the cell assembly group 678A depicted, a foam sheet 680 approximately the size of first outer surface 624 of cell assembly 610A is positioned to abut first outer surface 624. A heat plate 682A is positioned to abut second outer surface 626 of cell assembly 610A. Heat plate 682A includes a main body 684 and a pair of side walls 686, 688. When cell assembly group 678A is assembled, main body 684 abuts second outer surface 626 of cell assembly 610A, side wall 686 extends over first fold edge 620 of cell assembly 610A and side wall 688 extends over second fold edge 622 of cell assembly 610A. In certain embodiments, heat plate 682A is formed from aluminum sheet metal and main body 684 is approximately the size of second outer surface 626 of cell assembly 610A. A spacer 690A approximately the size of main body 684 is positioned to abut heat plate 682A. In one embodiment, spacer 690A is formed from a sheet of 0.007 inch thick Nomex® Type 411 material like body 650 of outer wrap 612. Cell assembly 610B, heat plate 682B, cell assembly 610C, heat plate 682C and spacer 690B are the same as the like components described above and are positioned to abut one another in a similar manner to that described above and as depicted in FIG. 17.

Figure 19:
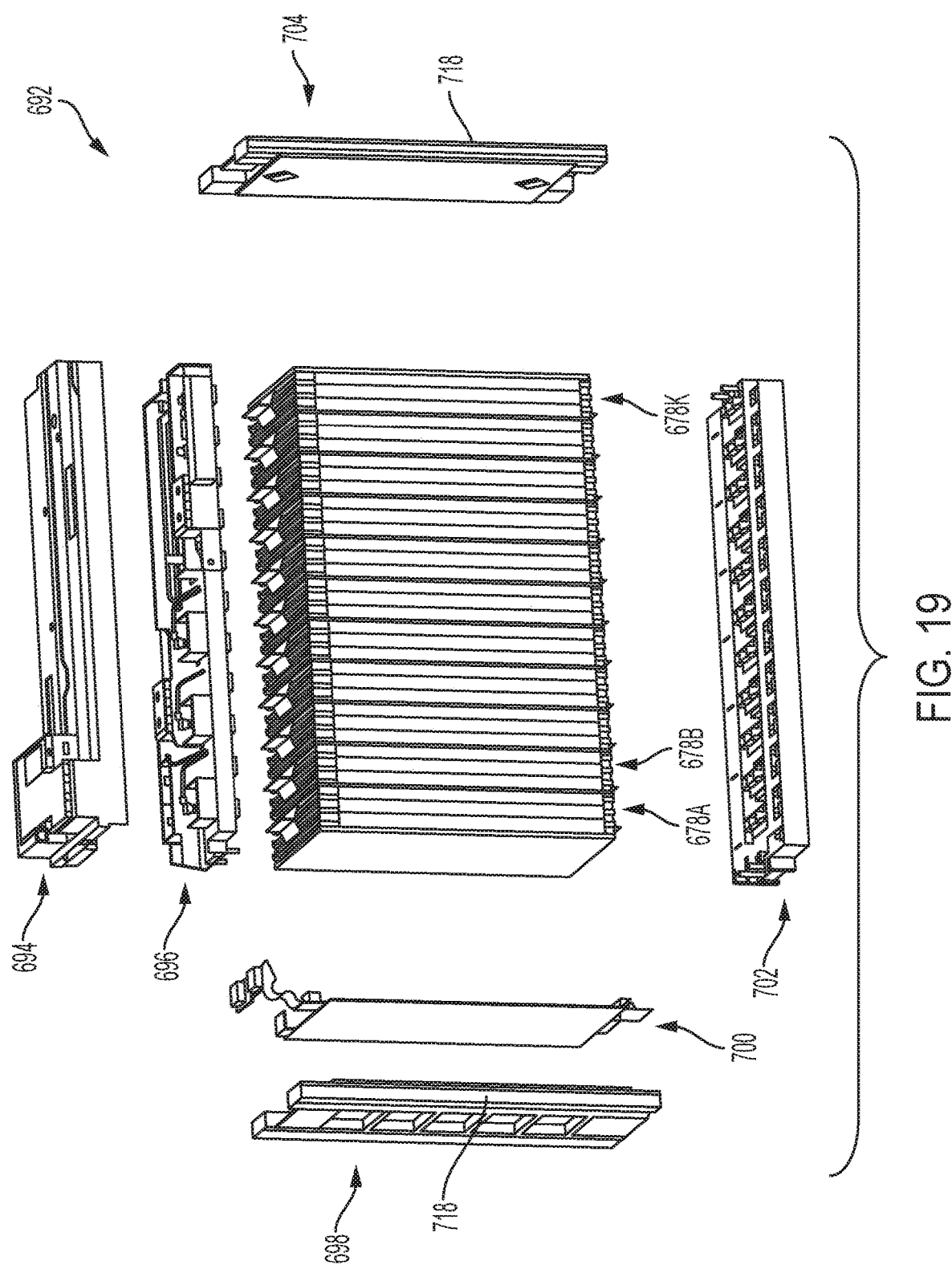
FIG. 19 is an exploded, perspective view of a cell module assembly ("CMA") core including a plurality of cell assembly groups according to one embodiment of the present disclosure.

Referring now to FIG. 19, cell assembly group 678A is shown as part of a CMA core 692 including a plurality of other cell assembly groups. In the depicted embodiment, CMA core 692 includes eleven cell assembly groups (only cell assembly group 678A, 678B and 678K are labeled for clarity). CMA core 692 further includes an upper cover 694, an upper tray 696, a first endplate 698, an inter-CMA lamination 700, a lower tray 702 and a second endplate 704 (the CMA housing is not shown in FIG. 19).

Figure 20:
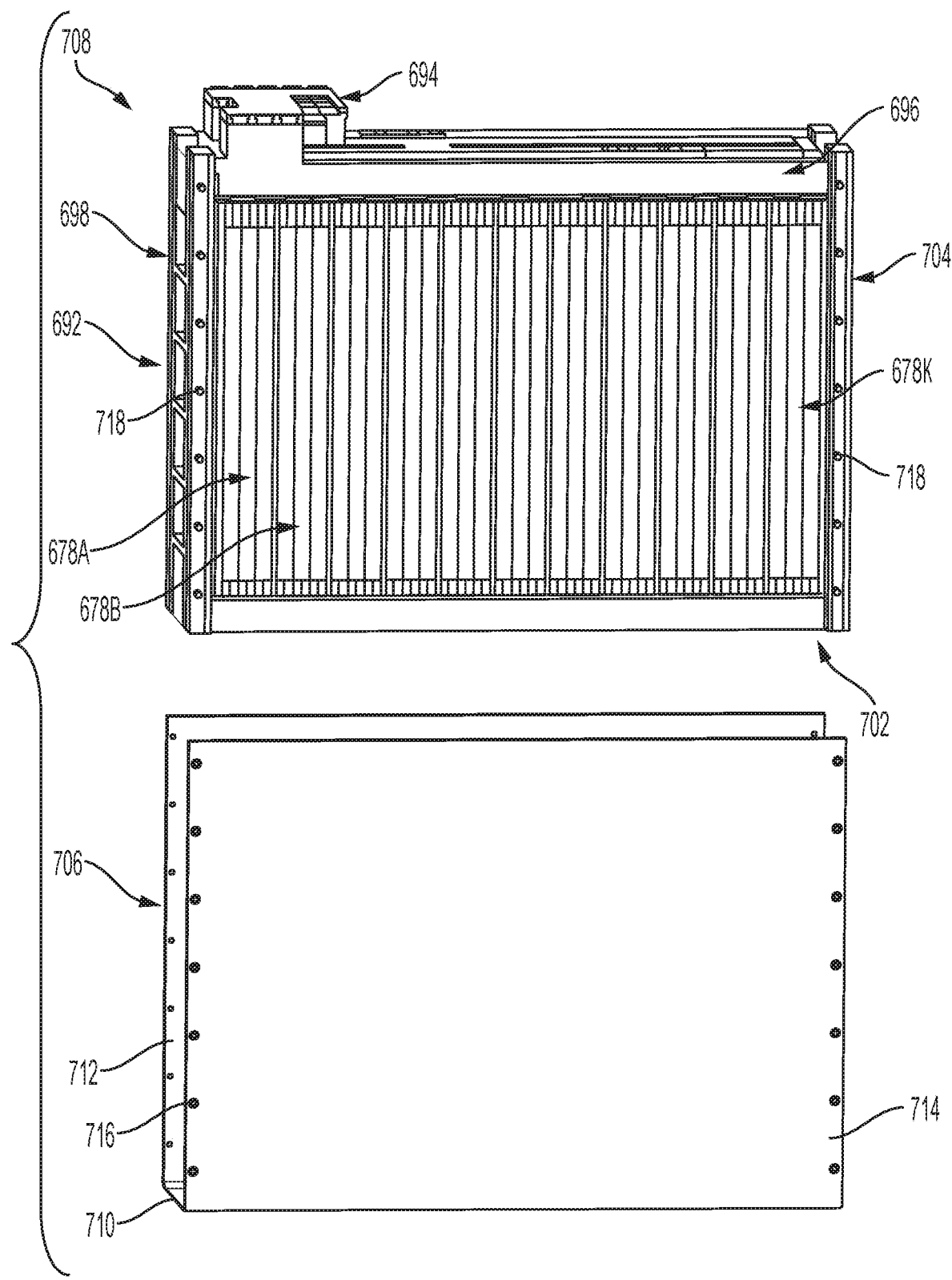
FIG. 20 is an exploded, perspective view of a CMA including the CMA core of FIG. 19 and a housing according to one embodiment of the present disclosure.
Figure 21:
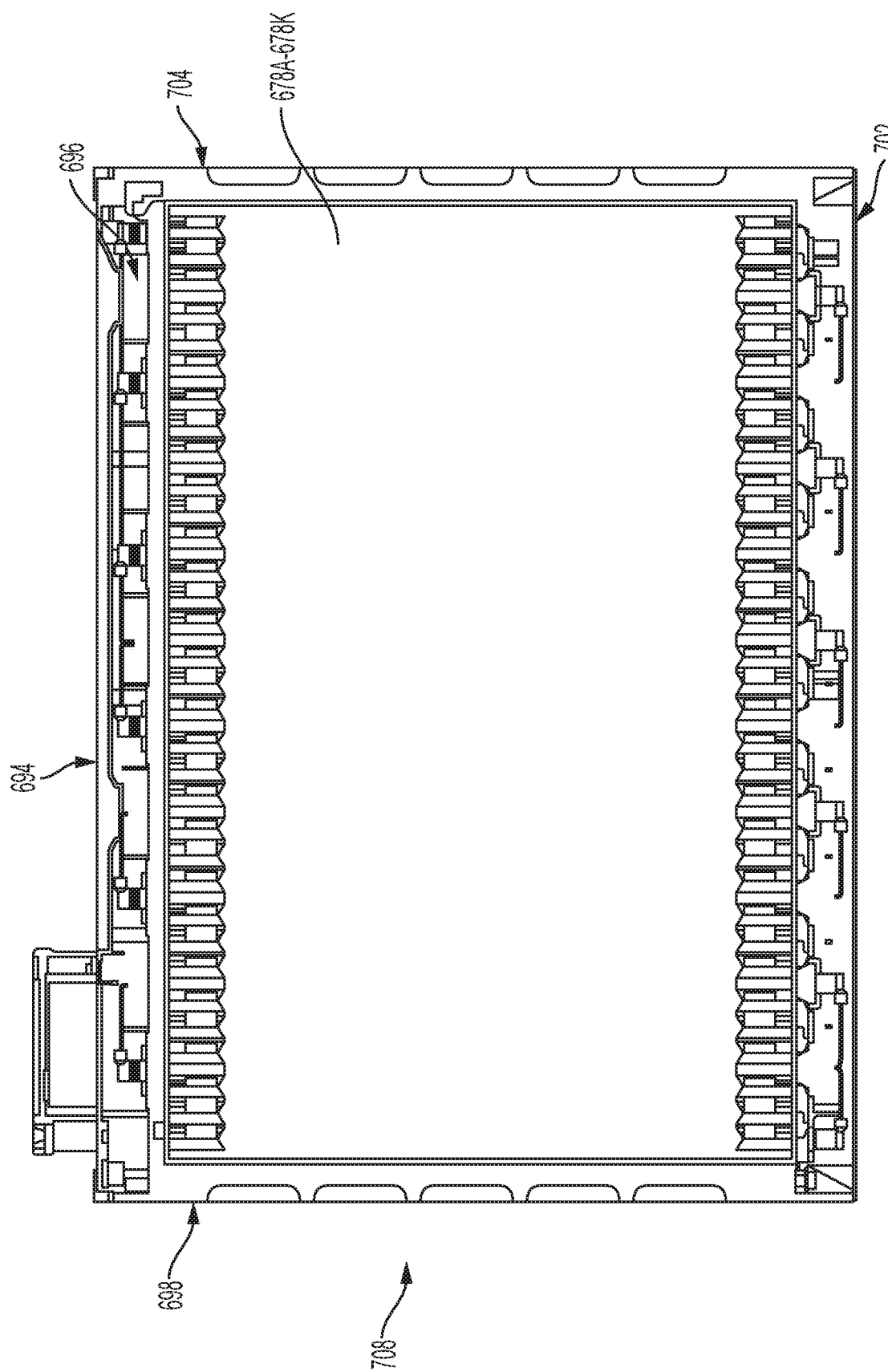
FIG. 21 is a cross-sectional view of the CMA of FIG. 20.

As shown in FIG. 20, CMA core 692 including cell assembly groups 678A-678K, upper cover 694, upper tray 696, first endplate 698, inter-CMA lamination 700, lower tray 702 and second endplate 704 is positioned within a housing 706 to form CMA 708. In the depicted embodiment, housing 706 is U-shaped, having a bottom wall 710 with a pair of side walls 712, 714 depending therefrom. CMA core 692 is positioned onto bottom wall 710 of housing 706 and between side walls 712, 714. Side walls 712, 714 each include a plurality of openings 716 that align with openings 718 (FIG. 19) on first endplate 698 and second endplate 704. A plurality of fasteners such as screws (not shown) are placed through side wall openings 716 and threaded into endplate openings 718 to secure CMA core 692 within housing 706 to form CMA 708. FIG. 21 is a cross-sectional view depicting CMA 708.

The design of CMA 708 provides a cost-effective energy storage device for a plurality of different applications. It is easy to assemble and difficult to assemble incorrectly. CMA 708 as described herein includes relatively few components and provides thermal runaway protection that may be improved relative to the other designs described herein. Additionally, it is much easier to control the thickness of the assembly as there is no need to spray intumescent paint into the metal heat plate in a controlled thickness.

As described above with reference to FIGS. 1-11, a plurality of CMAs 708 may be combined to form a LIB pack having various configurations. A LIB pack may include varying numbers of CMAs 708, as well as a larger system enclosure, control electronics, cables/connectors to interface with customer equipment, display modules and interface buttons, among other components as described above.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, it should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cell assembly group, comprising:
   a plurality of cell assemblies, each cell assembly including an electrochemical cell and an outer wrap surrounding the electrochemical cell;
   a foam sheet positioned adjacent one side of one cell assembly of the plurality of cell assemblies;
   a plurality of heat plates, each heat plate being positioned between two cell assemblies of the plurality of cell assemblies; and
   at least one spacer positioned between one heat plate of the plurality of heat plates and one cell assembly of the plurality of cell assemblies;
   wherein each outer wrap of each cell assembly of the plurality of cell assemblies includes:
      a body having an inner surface that engages a rearward wall of the electrochemical cell of the cell assembly,
      a first portion of the body having a flame barrier disposed thereon, the body configured to fold at a first fold such that the flame barrier contacts a forward wall of the electrochemical cell of the cell assembly, and
      the body further configured to fold at a second fold such that a second portion of the body overlaps and engages an outer surface of the first portion of the body.

2. The cell assembly group of claim 1, wherein at least one of the plurality of heat plates are formed from aluminum.

3. The cell assembly group of claim 1, wherein each of the plurality of heat plates extends around at least three sides of the electrochemical cell.

4. The cell assembly group of claim 1, wherein each of the plurality of heat plates is thermally coupled to a housing containing the cell assembly group.

5. The cell assembly group of claim 1, further comprising a polymeric resin at least partially encapsulating a plurality of electrochemical cells of the cell assembly group and the plurality of heat plates.

6. The cell assembly group of claim 5, wherein during an off gassing event of any one or more of the plurality of electrochemical cells, the polymeric resin is configured to rupture to direct gases away from the one or more of the plurality of electrochemical cells.

7. The cell assembly group of claim 1, wherein the second portion of each outer wrap includes a tape strip that engages the outer surface of the first portion to secure the second portion to the first portion.

8. The cell assembly group of claim 7, wherein each tape strip is formed from an acrylic based material.

9. The cell assembly group of claim 7, wherein each tape strip is positioned adjacent a first side edge of its corresponding outer wrap and each flame barrier is positioned adjacent a second, opposite side edge of the corresponding outer wrap.

10. The cell assembly group of claim 1, wherein the flame barrier of each outer wrap is formed from a ceramic coated polyethylene terephthalate sheet having a thickness of at least 0.006 inches.

11. A cell module assembly, comprising a plurality of cell assembly groups according to claim 1.

12. The cell assembly group of claim 1, wherein the electrochemical cell of each cell assembly is a lithium ion cell having at least a 45 amp/hour rating.

13. The cell assembly group of claim 1, wherein each outer wrap includes a body formed from aramid fiber material having a thickness of at least 0.007 inches.

14. A cell assembly group, comprising:
   a plurality of cell assemblies, each cell assembly including an electrochemical cell and an outer wrap surrounding the electrochemical cell;
   a foam sheet positioned adjacent one side of one cell assembly of the plurality of cell assemblies;
   a plurality of heat plates, each heat plate being positioned between two cell assemblies of the plurality of cell assemblies; and
   at least one spacer positioned between one heat plate of the plurality of heat plates and one cell assembly of the plurality of cell assemblies;
   wherein each outer wrap of each cell assembly of the plurality of cell assemblies includes:
      a body having an inner surface that engages a rearward wall of the electrochemical cell of the cell assembly,
      a first portion of the body having a flame barrier disposed thereon, the body configured to fold at a first fold such that the flame barrier contacts a forward wall of the electrochemical cell of the cell assembly,
      the body further configured to fold at a second fold such that:
         a second portion of the body engages an outer surface of the first portion of the body, and
         a side edge of the second portion of the body substantially aligns with the first fold.

15. The cell assembly group of claim 14, wherein each of the plurality of heat plates extends around at least three sides of the electrochemical cell.

16. The cell assembly group of claim 14, wherein each of the plurality of heat plates is thermally coupled to a housing containing the cell assembly group.

17. The cell assembly group of claim 14, wherein the flame barrier of each outer wrap is formed from a ceramic coated polyethylene terephthalate sheet having a thickness of at least 0.006 inches.

18. A cell module assembly, comprising a plurality of cell assembly groups according to claim 14.

19. The cell assembly group of claim 14, wherein each outer wrap includes a body formed from aramid fiber material having a thickness of at least 0.007 inches.

20. A cell assembly group, comprising:
   a plurality of cell assemblies, each cell assembly including an electrochemical cell and an outer wrap surrounding the electrochemical cell;
   a foam sheet positioned adjacent one side of one cell assembly of the plurality of cell assemblies;
   a plurality of heat plates, each heat plate being positioned between two cell assemblies of the plurality of cell assemblies; and
   at least one spacer positioned between one heat plate of the plurality of heat plates and one cell assembly of the plurality of cell assemblies;
   wherein each outer wrap of each cell assembly of the plurality of cell assemblies includes:
      a body having an inner surface that engages a rearward wall of the electrochemical cell of the cell assembly,
      a first portion of the body having a flame barrier disposed thereon, the body configured to fold at a first fold such that the flame barrier contacts a forward wall of the electrochemical cell of the cell assembly, and
      the body further configured to fold at a second fold such that a second portion of the body overlaps an outer surface of the first portion of the body.

\* \* \* \* \*